US012257590B2

(12) United States Patent
Jose et al.

(10) Patent No.: US 12,257,590 B2
(45) Date of Patent: Mar. 25, 2025

(54) SYSTEM FOR DETECTING THICKNESS OF A COATING AUTONOMOUSLY APPLIED TO A STRUCTURE

(71) Applicant: Foreman Technologies Inc., Hendersonville, TN (US)

(72) Inventors: Tom Jose, Hendersonville, TN (US); Matthew Grant Lopez, Frisco, TX (US); Nick Hegeman, Hendersonville, TN (US)

(73) Assignee: Foreman Technologies Inc., Hendersonville, TN (US)

( * ) Notice: Subject to any disclaimer, the term of this patent is extended or adjusted under 35 U.S.C. 154(b) by 0 days.

(21) Appl. No.: 18/202,203

(22) Filed: May 25, 2023

(65) Prior Publication Data

US 2023/0372957 A1 Nov. 23, 2023

Related U.S. Application Data

(63) Continuation-in-part of application No. 18/137,374, filed on Apr. 20, 2023.

(60) Provisional application No. 63/345,748, filed on May 25, 2022, provisional application No. 63/333,093, filed on Apr. 20, 2022, provisional application No. 63/333,100, filed on Apr. 20, 2022.

(51) Int. Cl.
*B05B 12/08* (2006.01)
*G01B 11/06* (2006.01)

(52) U.S. Cl.
CPC ........ *B05B 12/084* (2013.01); *G01B 11/0658* (2013.01)

(58) Field of Classification Search
CPC ..... B05B 12/084; B05B 12/00; B05B 13/005; G01B 11/0658
See application file for complete search history.

(56) References Cited

U.S. PATENT DOCUMENTS

| 3,248,020 A | 4/1966 | Spalding |
| 4,358,471 A | 11/1982 | Derkacs et al. |
| 4,919,977 A | 4/1990 | Yamane et al. |
| 5,090,361 A | 2/1992 | Ishibashi et al. |
| 5,103,761 A | 4/1992 | Ishibashi et al. |
| 5,240,745 A | 8/1993 | Yamamoto et al. |

(Continued)

OTHER PUBLICATIONS

Yano, A.; Hamada, K.; Amagai, K. Evaluation of Coating Film Formation Process Using the Fluorescence Method. Coatings 2021, 11, 1076. https://doi.org/10.3390/coatings11091076.*

(Continued)

*Primary Examiner* — James M Mellott
(74) *Attorney, Agent, or Firm* — Run8 Patent Group, LLC; Peter Miller

(57) ABSTRACT

A method includes: navigating a spray nozzle across and applying a coating to a region of a structure via the spray nozzle; illuminating the coating applied to the region; detecting an intensity of light emitted by the coating at the region; calculating a coating thickness of the coating applied to the region of the structure based on the intensity of light; in response to the coating thickness exceeding a threshold thickness, confirming application of the coating on the region of the structure; in response to the coating thickness falling below the threshold thickness, flagging the region of the structure for coating repair.

11 Claims, 6 Drawing Sheets

(56) References Cited

U.S. PATENT DOCUMENTS

| | | |
|---|---|---|
| 5,368,232 A | 11/1994 | Schroeder |
| 5,419,922 A | 5/1995 | Bajek |
| 5,578,128 A | 11/1996 | Schneider |
| 6,036,123 A | 3/2000 | West |
| 6,071,346 A | 6/2000 | Yamauchi et al. |
| 6,138,671 A | 10/2000 | Noakes et al. |
| 6,252,237 B1 | 6/2001 | Ramthun et al. |
| 6,315,648 B1 | 11/2001 | Neer |
| 6,533,861 B1 | 3/2003 | Matsuda et al. |
| 6,557,815 B1 | 5/2003 | Klein |
| 6,896,192 B2 | 5/2005 | Horan et al. |
| 6,908,048 B2 | 6/2005 | Di et al. |
| 6,929,698 B2 | 8/2005 | Shutic et al. |
| 7,909,265 B2 | 3/2011 | Adams et al. |
| 8,524,312 B2 | 9/2013 | Huda et al. |
| 9,095,865 B2 | 8/2015 | Ahmed et al. |
| 9,364,839 B2 | 6/2016 | Huda et al. |
| 9,919,330 B2 | 3/2018 | Letard et al. |
| 10,124,359 B2 | 11/2018 | Raman et al. |
| 10,183,542 B1 | 1/2019 | Bittner et al. |
| 11,110,475 B2 | 9/2021 | Hegeman |
| 11,235,344 B2 | 2/2022 | Raman et al. |
| 2003/0017256 A1 | 1/2003 | Shimane |
| 2003/0017276 A1 | 6/2003 | Yamada et al. |
| 2003/0141376 A1 | 7/2003 | Horan et al. |
| 2003/0215576 A1 | 11/2003 | Garner et al. |
| 2004/0020535 A1 | 2/2004 | Di et al. |
| 2005/0100680 A1 | 5/2005 | Bustgens |
| 2008/0047591 A1 | 2/2008 | Seitz et al. |
| 2008/0048049 A1 | 2/2008 | Adams et al. |
| 2008/0193632 A1 | 8/2008 | O'hara et al. |
| 2009/0007844 A1 | 1/2009 | Krogedal et al. |
| 2009/0050712 A1 | 2/2009 | Vitantonio et al. |
| 2010/0132409 A1* | 6/2010 | Billieres .................. C23C 4/08 106/286.6 |
| 2011/0088723 A1 | 4/2011 | Jensen et al. |
| 2011/0212254 A1 | 9/2011 | Morton |
| 2011/0253229 A1 | 10/2011 | Mattson et al. |
| 2012/0193445 A1 | 8/2012 | Rossner et al. |
| 2013/0122206 A1 | 5/2013 | Ahmed et al. |
| 2013/0122199 A1 | 9/2013 | Huda et al. |
| 2013/0236644 A1 | 9/2013 | Logan et al. |
| 2014/0220249 A1 | 8/2014 | Rouaud |
| 2015/0217318 A1 | 8/2015 | Letard et al. |
| 2016/0067726 A1 | 3/2016 | Gilpatrick et al. |
| 2016/0214132 A1 | 7/2016 | Morton |
| 2018/0021800 A1 | 1/2018 | Janik |
| 2018/0317627 A1 | 11/2018 | Fukuda et al. |
| 2018/0318865 A1 | 11/2018 | Harvison et al. |
| 2018/0326720 A1 | 11/2018 | Park et al. |
| 2019/0100047 A1 | 4/2019 | Tamaki et al. |
| 2019/0151881 A1 | 5/2019 | O'connell et al. |
| 2019/0161844 A1* | 5/2019 | Hanson .................. C23C 4/12 |
| 2019/0270110 A1* | 9/2019 | Urakami .............. B05B 13/04 |
| 2019/0374966 A1 | 12/2019 | Thompson et al. |
| 2020/0016619 A1 | 1/2020 | Raman et al. |
| 2020/0032528 A1 | 1/2020 | Telleria et al. |
| 2020/0197969 A1 | 6/2020 | Hegeman |
| 2021/0162435 A1 | 6/2021 | Vanzetto et al. |
| 2021/0370332 A1 | 12/2021 | Tani et al. |
| 2021/0387746 A1 | 12/2021 | Danko et al. |
| 2022/0055057 A1 | 2/2022 | Thompson et al. |
| 2022/0184646 A1 | 6/2022 | Yoshida et al. |

OTHER PUBLICATIONS

Chen et al., Trajectory planning for spray painting robot based on point cloud slicing technique, Electronics, vol. 9, No. 908, May 29, 2020 [retrieved on Aug. 17, 2023]. Retrieved from the Internet: . pp. 1-18.

International Search Report received in PCT/US2023/019306 dated Sep. 6, 2023.

International Search Report and Written Opinion for International Patent Application No. PCT/US2023/023609 mailed on Oct. 6, 2023; 26 pages.

Notification of the International Application Number and the International Filing Date for International Application No. PCT/US23/023609 mailed on Jun. 14, 2023; 1 page.

Non-Final Office Action for U.S. Appl. No. 17/462,852 dated Mar. 23, 2023.

Yano et al., Evaluation of coating film formation process using the fluorescence method, Coatings, vol. 11, No. 1076, Sep. 6, 2021 [retrieved on Aug. 17, 2023]. Retrieved from the Internet: . pp. 1-12.

* cited by examiner

SYSTEM FOR DETECTING THICKNESS OF A COATING AUTONOMOUSLY APPLIED TO A STRUCTURE

CROSS-REFERENCE TO RELATED APPLICATIONS

This Application claims the benefit of U.S. Provisional Application No. 63/345,748, filed on 25 May 2022, which is incorporated in its entirety by this reference.

This Application is a continuation-in-part application of U.S. patent application Ser. No. 18/137,374, filed on 20 Apr. 2023, which claims the benefit of U.S. Provisional Application No. 63/333,093, filed on 20 Apr. 2022, and 63/333,100, filed on 20 Apr. 2022, each of which is incorporated in its entirety by this reference.

TECHNICAL FIELD

This invention relates generally to the field of sprayed coating application and more specifically to a new and useful system for detecting thickness of a coating autonomously applied to a structure in the field of sprayed coating applications.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
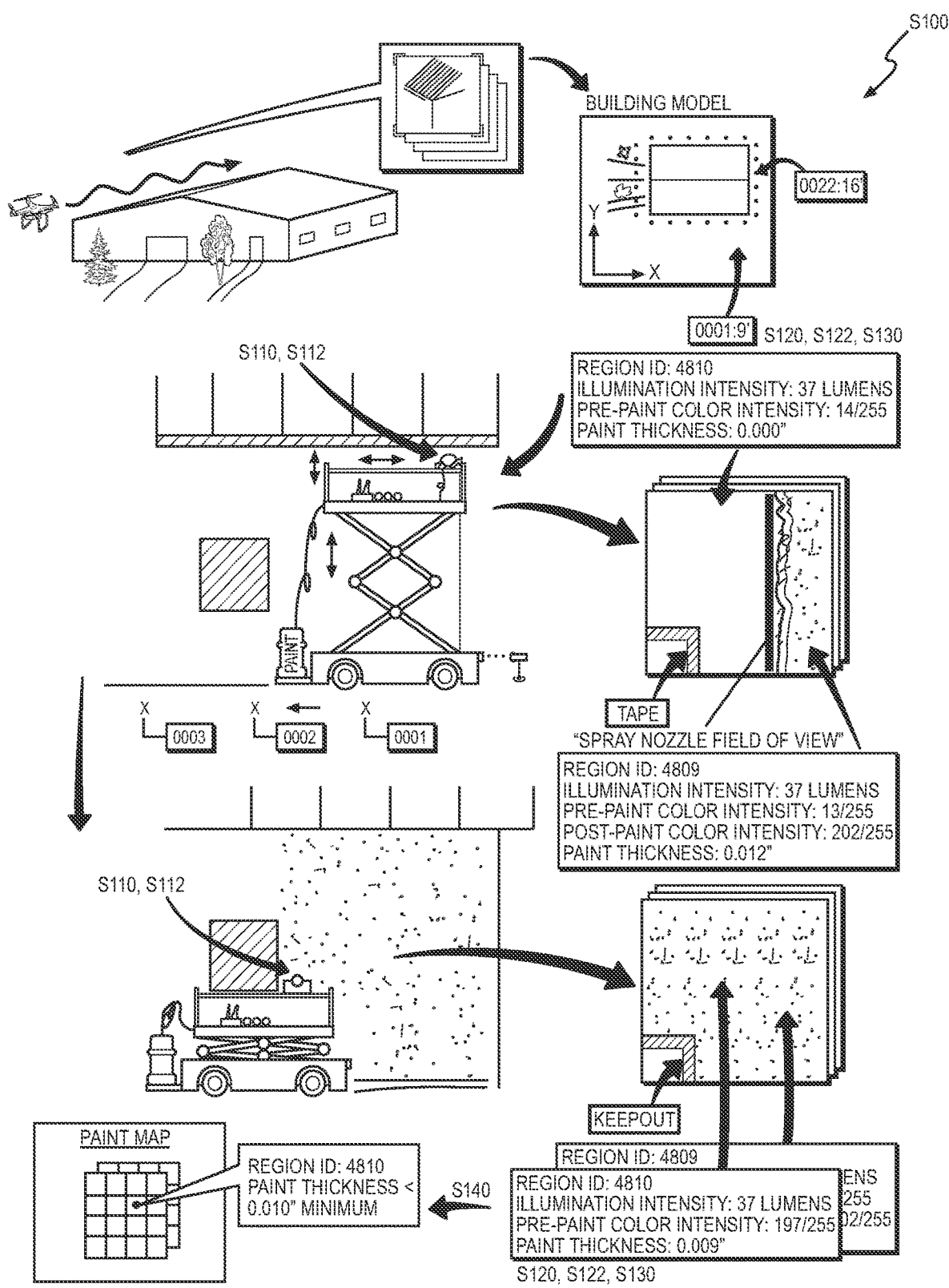
FIG. 1 is a flowchart representation of a method.

As shown in FIG. 1, a system 100 for tracking thickness of a coating autonomously applied to a structure includes: a chassis; a spray nozzle mounted on the chassis; a coating supply system configured to supply coating—including a fluorescent material (e.g., particulate, dye)—to the spray nozzle; an end effector configured to manipulate the spray nozzle on the chassis; and a thickness detection module, including a light element configured to illuminate coating applied to the structure by the spray nozzle and an optical sensor configured to capture images of the structure; and a controller.

The controller is configured to: trigger the end effector and the chassis to raster the spray nozzle across a surface of the structure while the coating supply system supplies coating to the spray nozzle to apply coating to the structure; deactivate the light element and trigger the optical sensor to capture a baseline image of a coated region of the structure behind the spray nozzle; immediately thereafter activate the light element to illuminate this coated region of the structure and trigger the optical sensor to capture a second image of the coated region; subtract the baseline image from the second image to generate a fluorescence image; access a coating thickness model that links fluorescence intensity and coating thickness for the coating; and implement the coating thickness model to convert color values of pixels in the fluorescence image into coating thicknesses within the coated region of the structure.

2. Method: Coating Map

Figure 2:
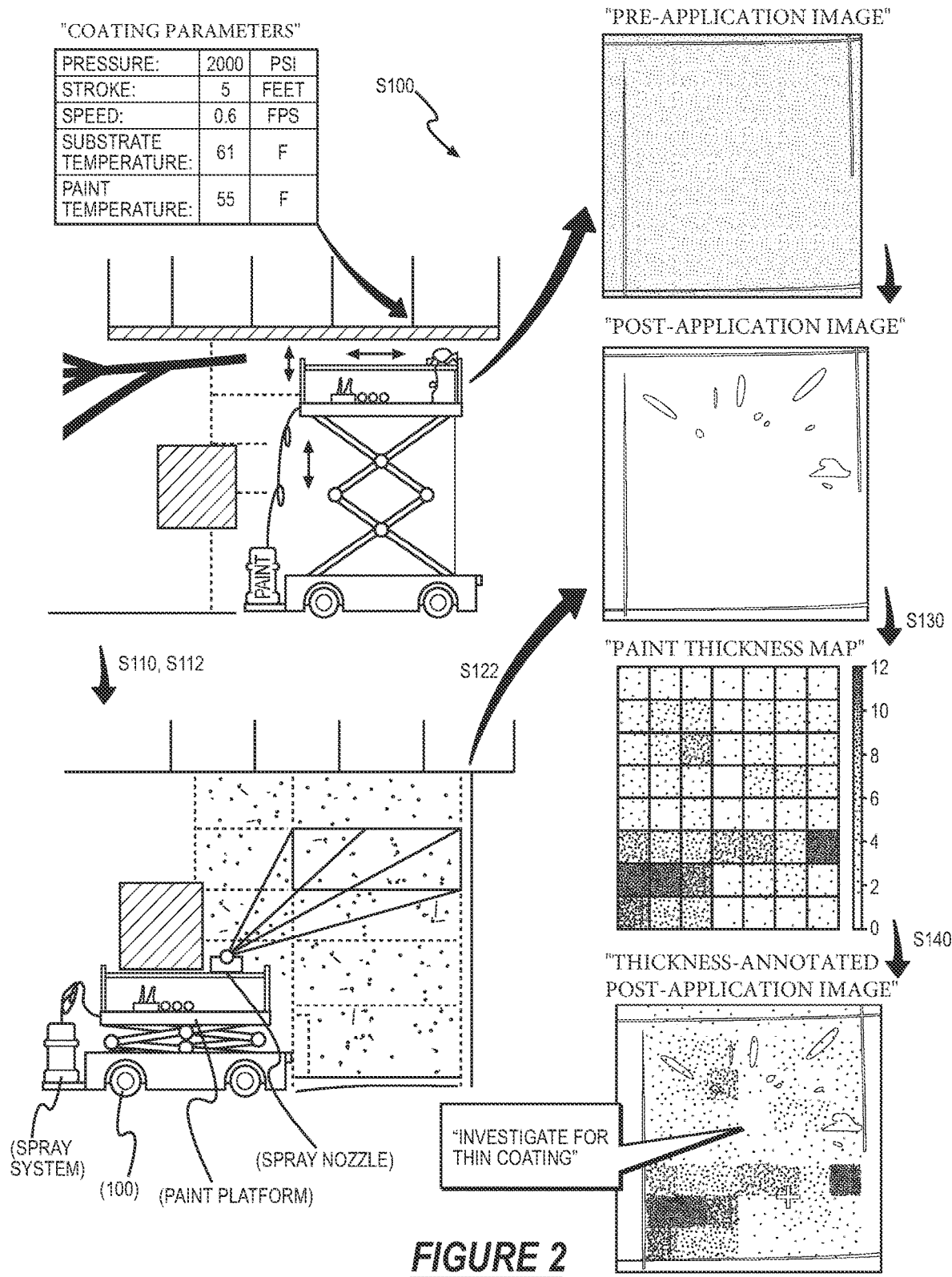
FIG. 2 is a flowchart representation of one variation of the method.

As shown in FIGS. 1 and 2, a method S100 includes: during a first coating period, navigating a spray nozzle across a first region of a structure in Block S110; and applying a coating to the first region of the structure via the spray nozzle in Block S112. The method S100 also includes: illuminating the coating applied to the first region of the structure in Block S120; detecting a first intensity of light at the first region of the structure in Block S122; converting the first intensity of light into a first coating thickness of the coating applied to the first region of the structure in Block S130; and annotating a first segment of a coating thickness map, corresponding to the first region of the structure, according to the first coating thickness in Block S140. The method S100 further includes, during a second coating period: navigating the spray nozzle across a second region of a structure in Block S110; and applying the coating to the second region of the structure via the spray nozzle in Block S112. The method S100 also includes: illuminating the coating applied to the second region of the structure in Block S120; detecting a second intensity of light at the second region of the structure in Block S122; converting the second intensity of light into a second coating thickness of the coating applied to the second region of the structure in Block S130; and annotating a second segment of the coating thickness map, corresponding to the second region of the structure and distinct from the first segment of the coating thickness map, according to the second coating thickness in Block S140.

2.1 Variation: Re-Coating

Figure 4:
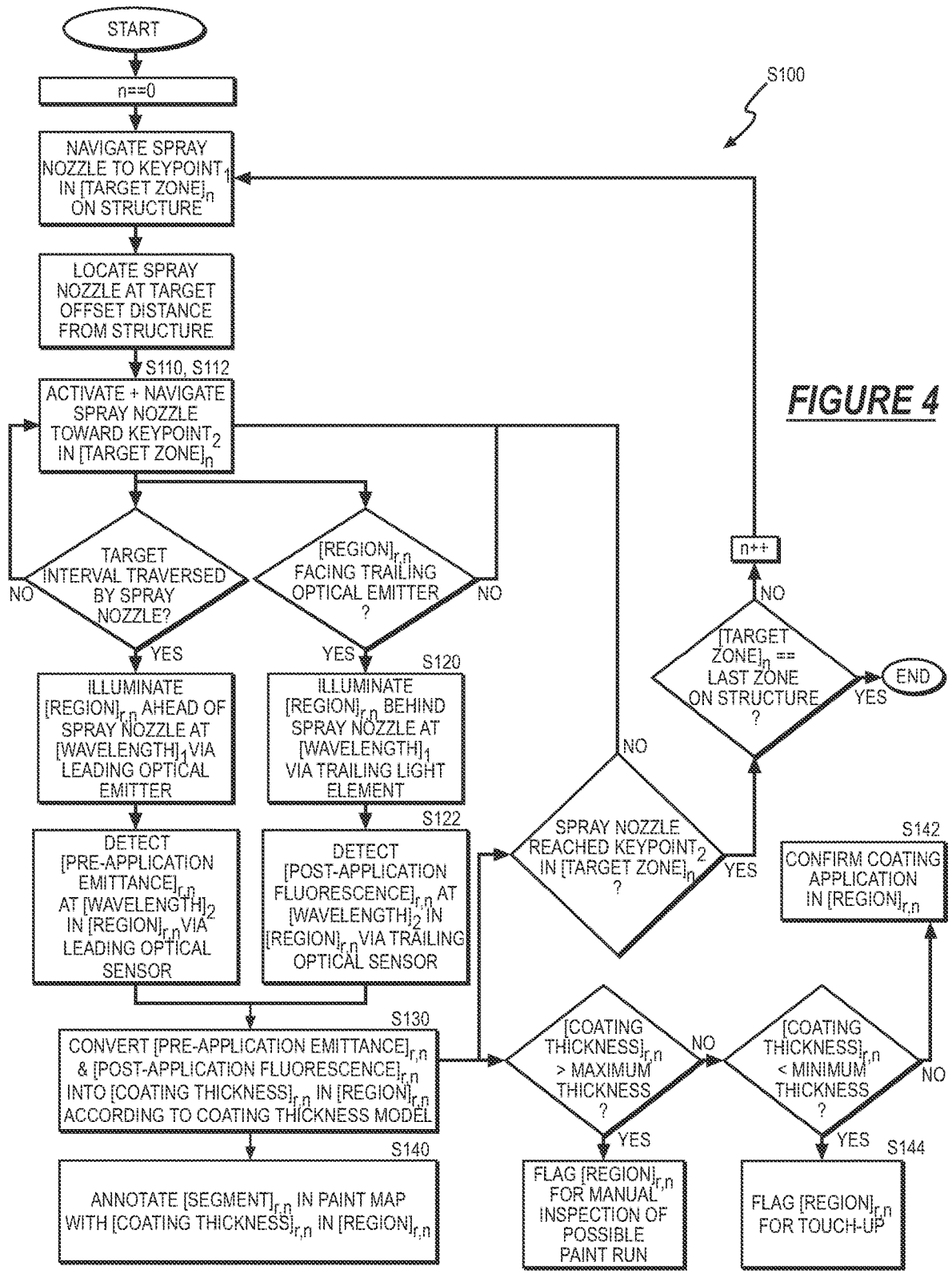
FIG. 4 is a flowchart representation of one variation of the method.

As shown in FIG. 4, one variation of the method S100 includes, during a first coating period: navigating a spray nozzle across a first region of a structure in Block S110; and applying a coating to the first region of the structure via the spray nozzle in Block S112. This variation of the method S100 also includes: illuminating the coating applied to the first region of the structure in Block S120; detecting a first intensity of light emitted by the coating applied to the first region of the structure in Block S122; calculating a first coating thickness of the coating applied to the first region of the structure based on the first intensity of light in Block S130; and, in response to the first coating thickness exceeding a threshold thickness, confirming application of the coating on the first region of the structure in Block S142. This variation of the method S100 further includes, during a second coating period: navigating the spray nozzle across a second region of the structure in Block S110; and applying the coating to the second region of the structure via the spray nozzle in Block S112. This variation of the method S100 also includes: illuminating the coating applied to the second region of the structure in Block S120; detecting a second intensity of light emitted by the coating applied to the second region of the structure in Block S122; calculating a second coating thickness of the coating applied to the second region of the structure based on the second intensity of light in Block S130; and, in response to the second coating thickness falling below the threshold thickness, flagging the second region of the structure for coating repair in Block S144.

3. Applications

Generally, the system 100 can: autonomously apply (e.g., spray) a coating onto exterior walls of a structure during a coating application procedure; capture post-coating application images of these walls of the structure during the coating application procedure; estimate thickness of the coating applied to the structure based on pixel values in these post-coating images and a calibrated coating thickness model that links color values and coating thickness; implement real-time closed-loop controls to modify coating parameters for applying coating on the structure based on differences between a target coating thickness for the structure and these image-based coating thickness estimates; and/or compile these image-based coating thickness estimates into a coating thickness map representing application of the coating across the structure.

In particular, the system 100 is described herein as: applying coating containing a fluorescent material onto a structure; illuminating (or "radiating") the structure with a wavelength of light that causes fluorescent material in the coating to fluoresce; capturing images of coated areas of the structure while illuminated; and converting pixel values—in a color or wavelength range at which the fluorescent material fluoresces—in (a form of) these images into thicknesses of the coating applied to corresponding areas of the structure based on a stored coating thickness model.

However, the system 100 can implement similar methods and techniques to convert pixel values—representing color, reflectance, or any other color value—in an image of a coated region of the structure into coating thickness estimates. For example, the system 100 can execute Blocks of the method S100 S100 to apply coating containing UV- or optically-activated pigment that exhibits fluorescent or color changes when illuminated.

Furthermore, the system 100 is described herein as: applying paint to exterior walls of a building during a paint application procedure; and compiling data captured during the paint application procedure into a paint map that represents thicknesses of paint applied to discrete regions (e.g., one-foot-square areas) on these exterior walls of the building. However, the system 100 can additionally or alternatively apply coatings of any other type to interior and/or exterior walls or surfaces of other structures, such as ships (e.g., a ship hull), aircraft, manufacturing equipment, port equipment, and/or shipping containers, etc.

Furthermore, the system 100 is described herein as: applying paint premixed with fluorescent material (e.g., particulate, dye) to a surface of a structure; irradiating (or "illuminating") the painted surface with light at a wavelength that causes the fluorescent material in the paint to fluoresce; detecting an intensity (or magnitude, amplitude, power) of light emitted by this fluorescent material when irradiated; and converting this intensity of light emitted (i.e., fluoresced) by the fluorescent material into a local thickness of the paint applied to this surface of the structure. However, the system 100 can additionally or alternatively: apply paint premixed with phosphorescent material (e.g., particulate, dye) to a surface of a structure; irradiate the paint before or after applying the paint onto the surface; detect an intensity of light emitted (i.e., phosphoresced) by this phosphorescent material after being irradiated; and convert this intensity of light emitted by the phosphorescent material into a local thickness of the paint applied to this surface of the structure. The system 100 can additionally or alternatively mix or meter fluorescent, phosphorescent, or other material into the paint in real-time during application of the paint onto the surface.

Furthermore, the system 100 is described herein as: applying paint to a surface of a structure; irradiating (or "illuminating") the painted surface; detecting an intensity (or magnitude, amplitude, power) of light emitted, reflected, or absorbed by the applied paint when irradiated; and converting this intensity of light into a local thickness of the paint applied to this surface of the structure. However, the system 100 can additionally or alternatively: irradiate the surface prior to application of the paint; detect an intensity of light emitted, reflected, or absorbed by an existing coating on the surface when irradiated; and convert this intensity of light into a local thickness of the existing coating on this surface. The system 100 can then selectively apply paint to or flag the surface for further preparation before application of paint based on this local thickness, such as by: applying paint only if the thickness of an existing primer on this surface exceeds a minimum primer thickness; or applying paint only if most or all of a previous coating is removed from the surface (e.g., exhibits a thickness less than a maximum thickness).

4. System Components

Generally, the system 100 for autonomously applying coating to a structure includes: a chassis including a drive system; a work platform configured to raise and lower on the chassis; a spray system including a spray nozzle and a coating supply subsystem configured to selectively supply wet coating from a coating reservoir to the spray nozzle; an end effector; an optical sensor; a depth sensor; and a controller. The end effector is mounted to the work platform and is configured to support the spray nozzle on the work platform and to direct the spray nozzle over a range of positions. The optical sensor is arranged on the work platform and is configured to capture images of a target surface on the structure. The depth sensor is configured to output distance values representative of distances between the spray nozzle and the target surface.

The controller is configured to autonomously: detect the target zones and keepout zones, on the target surface, proximal the spray nozzle based on features detected in images captured by the optical sensor; actuate the drive system to navigate the chassis along lateral segments of the target surface; actuate the work platform to navigate the spray nozzle vertically within lateral segments of the target surface; actuate the end effector to direct coating, exiting the spray nozzle, across lateral segments of the target surface; selectively actuate the spray system to dispense coating from the spray nozzle in response to detecting target zones proximal the spray nozzle; and selectively deactivate the spray system in response to detecting keepout zones proximal the spray nozzle. The controller is further configured to, for each subregion of the target surface: estimate a coating thickness of the coating applied to the subregion of the target surface based on coating flow rate through the spray system and actuation speed of the end effector during application of the coating onto the subregion of the target surface; and store the coating thickness in association with a location of the subregion on the target surface. The controller is also configured to store an image, captured by the camera and depicting the subregion of the target surface, in association with the subregion of the target surface.

4.1 End Effector

In one implementation, the end effector includes a linear stage configured to cycle the spray nozzle laterally across a target surface of the structure. In this implementation, the controller can actuate the single linear stage to cyclically drive the spray nozzle laterally across a segment (e.g., a four-foot-wide segment) of the target surface while intermittently lowering (or raising) the work platform, thereby rastering the spray nozzle across the segment of the target surface and maintaining the spray nozzle substantially normal to the target surface.

In another implementation, the end effector includes a set of linear stages configured to cycle the spray nozzle laterally and vertically across the target surface. In this implementation, the controller can actuate the set of linear stages to drive the spray nozzle vertically and laterally across a segment (e.g., a four-foot-wide, four-foot-tall segment) of the target surface, thereby rastering the spray nozzle across this segment of the target surface and maintaining the spray nozzle substantially normal to the target surface. In this implementation, following completion of application of the coating onto this segment of the target surface, the computer system can trigger the work platform to lower (or rise) to locate the spray nozzle in a next segment of the target surface.

In the foregoing implementations, the end effector can further include a depth stage configured to drive the spray nozzle—and coupled depth sensors—longitudinal substantially normal to the target surface. Accordingly, the controller can: monitor a distance between the spray nozzle and the target surface via the depth sensor; and implement closed-loop controls to maintain a target distance between the spray nozzle and the target surface by selectively actuating the depth stage of the end effector.

Additionally or alternatively, the end effector can include a set of rotary stages configured to adjust pitch and/or yaw orientations of the spray nozzle and coupled depth sensors. In this implementation, the controller can: monitor distances between the spray nozzle and a set of (e.g., three or more) laterally- and vertically offset points on an adjacent region of the target surface via the depth sensor; and implement closed-loop controls to adjust the pitch and/or yaw orientations of the end effector and equalize distances to these three points on the adjacent region of the target surface, thereby maintaining the spray nozzle normal to the region of the target surface in its spray field.

For example, the end effector can include a multi-axis gantry. Alternatively, the end effector can include a robotic arm including multiple segments and joints.

4.2 Optical and Depth Sensors

In one implementation, the system 100 includes a near-field 2D color (e.g., RGB, multispectral) camera: arranged proximal the spray nozzle and defining a focal axis approximately parallel to a spray axis of the spray nozzle such that the field of view of the color camera intersects a spray field of the spray nozzle; and configured to capture 2D color images of the target surface before, during, and/or after the spray nozzle applies (i.e., sprays) coating on the adjacent target surface. For example, the system 100 can include: a left color camera arranged to the left of the spray nozzle and configured to capture images of the target surface ahead of the spray nozzle as the end effector moves the spray nozzle leftward; and a right color camera arranged to the right of the spray nozzle and configured to capture images of the target surface ahead of the spray nozzle as the end effector moves the spray nozzle rightward.

Additionally or alternatively, the system 100 can include a near-field 3D stereoscopic camera arranged proximal the spray nozzle and configured to capture 3D color images of the target surface. The system 100 can similarly include a near-field multi-point depth sensor (e.g., a set of single-point depth sensors, a 3D LIDAR sensor): arranged proximal the spray nozzle and defining a focal axis approximately parallel to the spray axis of the spray nozzle; and configured to capture depth values or depth maps representing distances from the spray nozzle to points on the target surface in the spray field of the spray nozzle.

For example, the depth sensor can be configured to detect: peripheral distances to at least three discrete points—on a nearby surface—offset about a 20-inch-diameter circle centered on the axis of the spray nozzle at a distance of twelve-inches from the spray nozzle; and a center distance to a discrete point—on the nearby surface—approximately centered on the axis of the spray nozzle at a distance of twelve-inches from the spray nozzle.

In the foregoing implementations, the system 100 can also include a housing with an actuatable aperture arranged adjacent the spray nozzle, such as mounted on or near the end effector. In this implementation, the near-field color, the near-field stereoscopic camera, and/or the depth sensor can be arranged in the housing. Accordingly, the controller can: trigger the aperture to close when the spray system is actuated in order to shield these sensors from overspray; and selectively trigger the aperture to open and these sensors to capture images, depth values, and/or depth maps when the spray system is inactive.

Additionally or alternatively, the system 100 can include a far-field 2D color camera, a far-field 3D stereoscopic camera, and/or a far-field depth sensor, such as: arranged on the work platform; and offset behind the spray nozzle (e.g., where these sensors are less subject to overspray).

In the foregoing implementations, the near-field sensors can be arranged on the end effector and thus move with the spray nozzle. Alternatively, these near-field sensors can be fixedly mounted to the work platform, and the controller can: derive a position (i.e., offset distance and orientation) of the work platform relative to the target surface based on data captured by these sensors; track a position of the spray nozzle relative to the work platform (e.g., by reading position sensors or encoders arranged on actuators or stages in the end effector); and fuse these platform-to-target-surface data positions and platform-to-spray nozzle positions to track the position of the spray nozzle relative to the nearby target surface.

The far-field optical and depth sensors can be similarly coupled to or decoupled from the end effector and the spray nozzle, and the controller can similarly track relative positions of the target surface, these far-field sensors, and the spray nozzle.

4.3 Coating Thickness Detection Module

In one variation, the system 100 includes a coating thickness detection module configured to: illuminate a coated region of the target surface; and to capture an image of the region of the target surface when illuminated. Because the coating contains a fluorescent material, the controller can estimate a thickness of the coating within this region of the target surface based on: intensities of light—in a fluorescent wavelength range of the coating—in pixels of the image; and an illumination intensity of this region of the target surface.

4.3.1 Active Lighting

In this variation, the coating thickness detection module can include a light element: arranged on the work platform; and configured to illuminate coating applied to the target surface on the structure by the system 100 and thus causing the applied coating to fluoresce.

In one implementation, the light element includes: a light source configured to output light across a light plane; and a directional light filter extending across the light source, configured to pass light output by the light source substantially normal to the light plane, and configured to reject light output by the light source substantially nonparallel to the light plane. In this implementation, the light element can be arranged on the work platform such that the light plane is parallel to the axis of the spray nozzle. Therefore, the light element can uniformly illuminate an adjacent region of the target surface when the system 100 locates the axis of the spray nozzle normal to this target surface.

For example, the light element can include a grid array of light elements arranged across the light plane, such as: a set of cold-cathode fluorescent lamps (CCFLs) spanning the light plane; a two-dimensional array of LEDs spanning the light plane; or a planar light guide spanning the light plane and one or more rows and columns of LEDs arranged about the perimeter of the light guide. However, the light source can include any other light source type configured to output light across an area (e.g., the light plane) or cluster of light sources (e.g., point sources) that cooperate to output light across an area. In this example, the directional light filter: can be arranged across the light source; can pass light output from the light source substantially normal to the light plane; and can reject light output from the light source at angles other than substantially normal to the light plane. In particular, the directional light filter can limit a maximum angle between light rays passed from the light source into the imaging volume between the nest module and the sensor module, thereby limiting the angle of incident light rays on the target surface to a similarly narrow angular range and increasing lighting consistency across the adjacent region of the target surface.

In this variation, the coating thickness detection module can include the optical sensor described above, such as including a multi- or hyper-spectral camera configured to detect incident light intensity within a particular range of wavelengths fluoresced by the coating when illuminated by the light element. More specifically, in this implementation, the controller can execute methods and techniques described herein to: navigate the spray nozzle across the target surface; activate the spray system to spray coating through the spray nozzle onto the target surface; selectively activate the light element to illuminate this region of the target surface; trigger the optical sensor to capture a multi- or hyper-spectral image of this region of the target surface; and then estimate a thickness of the coating within the region of the target surface based on intensity of light—in the particular range of wavelengths fluoresced by the coating—represented in pixels in this multi- or hyper-spectral image.

Alternatively, the coating thickness detection module includes a separate optical coating thickness sensor, such as a separate multi- or hyper-spectral camera. Accordingly, in this implementation, the controller can execute methods and techniques described herein to: navigate the spray nozzle across the target surface; and selectively activate the spray system to spray coating through the spray nozzle onto the target surface based on features detected in color and/or depth images captured by the optical sensor(s) described above. In this implementation, the controller can also: selectively activate the light element to illuminate this region of the target surface; trigger the optical coating thickness sensor to capture a multi- or hyper-spectral image of this region of the target surface; and then estimate a thickness of the coating within the region of the target surface based on intensity of light—in the particular range of wavelengths fluoresced by the coating—represented in pixels in this multi- or hyper-spectral image.

Furthermore, in this variation, the coating thickness detection module can include a shade box configured to shield a region of the target surface—in the field of view of the optical sensor (or the optical coating thickness sensor)—from incident ultraviolet light. In this variation, when reading a thickness of the coating applied to a region of the target surface, the controller can: capture a first image of the target surface via the optical sensor when the light element is inactive at a first time; capture a second image of the target surface via the optical sensor when the light element is active at a second time immediately succeeding (e.g., one second following) the first time; and subtract pixel values in the first image from values of corresponding pixels in the second image to generate a normalized image. Accordingly, pixel values in the normalized image may represent fluorescent intensity of the applied coating under active illumination, corrected for incident ambient light. The controller can therefore directly convert these pixel values into coating thicknesses of corresponding areas in the region of the target surface.

4.3.2 Passive Lighting

In another implementation, the coating thickness detection module includes an ambient light level sensor configured to detect intensity and/or wavelengths of ambient light incident near the target surface. In this implementation, the controller can thus normalize the fluorescent intensity of applied coating represented in an image of the target surface based on the intensity and/or wavelengths of ambient light detected by the ambient light level sensor.

4.3.3 Multiple Coating Thickness Detection Modules

In one variation, the system 100 includes: a left coating thickness detection module arranged to the left of the spray nozzle; and a similarly right coating thickness detection module arranged to the right of the spray nozzle.

4.4 Other Sensors

In one variation, the system 100 further includes: an ambient temperature sensor; an infrared thermometer configured to read a surface temperature of the target surface; a windspeed sensor; and/or a humidity sensor; etc., such as mounted to the work platform proximal the spray nozzle.

5. Fluorescent Coating

The system 100 is configured to load with a coating containing a fluorescent material that fluoresces within a particular wavelength range when illuminated, such as with ultraviolet light or with a different wavelength of light.

In one variation, the fluorescent material can degrade over time, such as when exposed to ultraviolet light, such that the fluorescence of the coating on the structure diminishes over time.

6. On-Site Calibration

Figure 3:
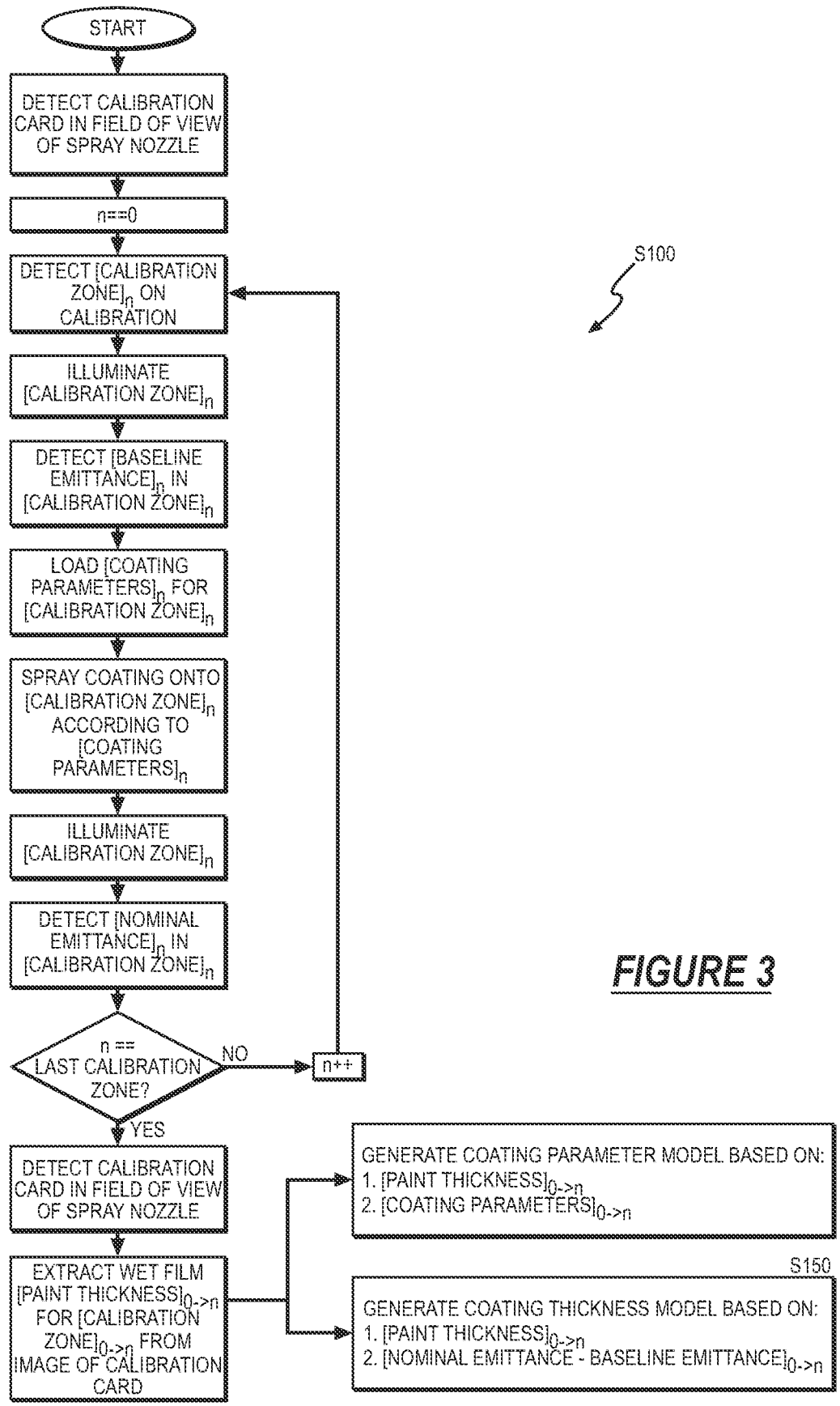
FIG. 3 is a flowchart representation of one variation of the method.

In one implementation shown in FIG. 3, the coating—including fluorescent material—is associated with a pre-generated coating thickness model that relates fluorescence intensity and thickness of the coating following application (e.g., via spraying) onto a surface and when irradiated with a target intensity of light in a target wavelength. In this variation, the system 100 can load this pre-generated coating thickness model in preparation for autonomously applying the coating to the structure.

Alternatively, one variation of the method S100 includes Block S150, which recites generating a coating thickness model for the coating. Generally, in this variation, the system 100 can cooperate with an onsite operator to generate and calibrate a coating thickness model for application of the particular batch of the coating on the particular structure by the system 100 at a particular time under particular ambient and site conditions.

In one implementation, an operator locates a calibration card near the spray nozzle and triggers the system 100 to execute a calibration routine. The controller then: implements closed-loop controls to move the spray nozzle to a target standoff distance from the calibration card; activates the coating system while sweeping the spray nozzle across the calibration card to spray coating through the spray nozzle onto the calibration card; captures a sequence of the coating thickness calibration images of the calibration card; and characterizes fluorescence of regions of the calibration card based on pixel intensities in these coating thickness calibration images, such as within 20 seconds for a one-meter-square calibration card. The operator then: manually measures coating thicknesses across the calibration card, such as with a wet film thickness gauge; and feeds these coating thicknesses to the system 100. The controller then: spatially pairs these manually-entered coating thicknesses with fluorescence detected in corresponding regions of the calibration card; and derives a coating thickness model that predicts thickness of the coating based on fluorescence represented in post-coating images captured by the system 100.

6.1 Calibration Card

In one implementation, the system 100 is paired with a calibration card that defines a set of the paintable calibration zones representative of substrate and/or surface preparation of the structure. In particular, each calibration zone can define a flat, planar surface such that a wet film thickness gauge seats flat against the calibration zone.

In this implementation, the calibration card can include: optical fiducials detectable by the system 100 to spatially register the spray nozzle relative to the calibration card; and/or optical fiducials detectable by the system 100 and by an operator to locate predefined calibration zones on the calibration card, such as target locations for manual coating thickness measurements, regions exhibiting different surface preparation characteristics (e.g., bare, primed, coated), and/or regions exhibiting different substrate types (e.g., metal, wood, concrete, fiber-reinforced cement board).

In one example, the calibration card includes: a flat, one-yard-square panel; barcodes or other visual reference markers near corners of the calibration card and identifying a type or configuration of the calibration card; a grid of blue lines separating the face of the panel into nine one-foot-square calibration zones; and one optical fiducial (e.g., a barcode, a number) arranged in and uniquely identifying each calibration zone.

In another example, the calibration card includes: a flat, one-yard-wide, one-foot tall rectangular panel; barcodes or other visual reference markers near corners of the calibration card and identifying a type or configuration of the calibration card; a series of blue vertical lines arranged at a horizontal pitch distance along the width of the panel and segmenting the panel into ten two-inch-wide calibration zones; and one optical fiducial (e.g., a barcode, a number) arranged in and uniquely identifying each calibration zone.

Therefore, in this implementation, the system 100 can implement different combinations of the coating parameters—such as flow rate, standoff distance, and/or spray overlap—during a calibration routine in order to achieve different coating thicknesses in each calibration zone of the calibration card.

Following application of the coating on the calibration card by the system 100, the controller can: record coating thicknesses manually measured on the calibration card and entered by the operator; derive a coating thickness model that predicts coating thickness based on coating fluorescence; and derive an coating parameter model that predicts coating thickness based on coating parameters. The controller can then: implement the coating thickness model to automatically map and verify coating thickness on the structure during a coating application routine; and implement the coating parameter model to automatically select baseline or initial coating parameters for the structure in preparation for the coating application routine.

6.1.1 Calibration Card Set

In one variation, the system 100 is paired with a set of calibration cards, each defining a paintable calibration zone and including a different substrate material and/or surface preparation.

In particular, different substrate and surface preparations may absorb coating differently and therefore yield different wet film thicknesses. Furthermore, coating and fluorescent material penetration into the substrate may contribute to total fluorescence of the coated substrate, but may not contribute to the wet film thickness of the applied coating. For example: coated metal may exhibit minimal coating absorption and therefore yield greatest wet film thickness per unit volume of the coating applied per unit area; conversely, primed wood may exhibit greater coating absorption and therefore yield less wet film thickness per unit volume of the coating applied per unit area; and uncoated and unprimed cementitious materials may exhibit greatest coating absorption and therefore yield least wet film thickness per unit volume of the coating applied per unit area.

Therefore, the system 100 can be paired with a set of calibration cards exhibiting a range of substrate and surface preparation combinations. For example, the system 100 can be paired with individual calibration cards including bare, primed, and coated samples of metal, brick, fiber-reinforced cement board, concrete, and wood for a total of 15 calibration cards.

In another example, the system 100 is paired with: one calibration card for wood substrate, including a set of calibration zones containing base, primed, and coated wood substrates; and similar sets of calibration cards for metal, brick, fiber-reinforced cement board, concrete. In a similar example, the system 100 is paired with one calibration card containing multiple substrate and surface preparation combinations present on the structure. Therefore, in these examples, the system 100 can cooperate with the operator to: coating a calibration card; test coating thicknesses on a particular substrate on the calibration card matched to a substrate present at the work site for a range of surface preparations that the system 100 may encounter at the work site; and generate a calibrated coating thickness model for each of these substrate and surface preparation pairs.

Therefore, in this implementation, the operator may select a particular calibration card corresponding to substrates and surface preparations present on the work site and trigger the system 100 to apply coating to the particular calibration card during a calibration routine. Following application of the coating on the calibration card by the system 100, the controller can: record coating thicknesses manually measured on the calibration card and entered by the operator; and derive a coating thickness model that predicts coating thickness based on coating fluorescence for each substrate and surface preparation combination. The controller can then: automatically detect substrate and surface preparation characteristics on target surfaces of the structure during a coating application routine; select coating thickness models for each target surface based on its substrate and surface preparation characteristics; and automatically map and verify coating thicknesses applied to each target surface of the structure based on these coating thickness models.

6.2 Coating Thickness Calibration Routine Setup

Once the operator and the system 100 arrive on the work site, the operator may: select a calibration card; locate the calibration card near the system 100; and trigger the system 100 to execute a coating thickness calibration routine.

In one implementation, when triggered to execute a coating thickness calibration routine, the system 100 can: capture a sequence of images via the optical sensors arranged on the work platform; detect a set of optical fiducials—representing the calibration card—in these images; and navigate the work platform and the end effector to locate a first corner of the calibration card in the spray field of the spray nozzle.

In this implementation, the controller can also: detect optical fiducials (e.g., barcodes, blue lines) on the calibration card; identify calibration zones on the calibration card based on these optical fiducials; and assign a target calibration coating thickness to each calibration zone. For example, for a calibration card that includes nine discrete calibration zones, the controller can: calculate a set of target calibration coating thicknesses including 70%, 80%, 90%, 100%, 110%, 120%, 140%, 160%, and 200% on the minimum coating thickness specified for the coating and/or for the structure; and assign each target calibration coating thickness in this set to one calibration zone on the calibration card.

In this implementation, the controller can then set coating parameters for each calibration zone based on corresponding target calibration coating thicknesses. For example, the controller can retrieve: a geometry (e.g., vertical and lateral spray angles) of the spray nozzle currently installed in the spray system; a target nozzle standoff distance from a target surface (e.g., twelve inches); and a minimal coating spray overlap (e.g., 50%). Then, for each calibration zone, the controller can: calculate a vertical raster pitch distance (e.g., six inches) based on the nozzle spray geometry and the minimal coating spray overlap; set or calculate a nominal coating flow rate; and/or calculate a raster speed (e.g., two feet per second) based on the nominal coating thickness, the vertical raster pitch distance, the nozzle spray geometry, and the nominal coating flow rate.

However, the controller (or the computer system) can retrieve or calculate coating parameters for individual calibration zones on the calibration card in any other way.

6.3 Calibration Zone Coating Application

Once confirmed by the operator, the controller can execute the calibration routine to apply coating onto calibration zones of the calibration cards based on these coating parameters.

In one implementation, the controller: accesses a color image of the calibration card captured by the optical sensor; identifies a particular calibration zone in the spray field of the spray nozzle based on optical fiducials or other features detected in the color image; retrieves coating parameters for the particular calibration zone; accesses a depth image captured by the depth sensor; extracts a current standoff distance between the spray nozzle and the calibration card from this depth image; implements closed-loop controls to reduce a difference between the current standoff distance and a target standoff distance set for this calibration zone; activates the coating supply subsystem to supply coating at the volume flow rate set for this calibration zone; and controls the end effector to raster the spray nozzle across the calibration zone at a raster speed set for the calibration zone.

The controller can repeat this process based on each subsequent color image and depth image captured during the calibration routine.

Upon applying coating to a last calibration zone on the calibration card, the controller can terminate the calibration routine.

6.4 Fluorescence Image

Generally, while driving the spray nozzle leftward across the calibration card, the controller can capture images (e.g., color, multi-spectral images) of a region of the calibration card recently coated with coating by the spray nozzle.

In one implementation, while driving the spray nozzle leftward across the calibration card, the controller selectively: deactivates the light element and triggers the optical sensor in the right coating thickness detection module to capture a baseline image at a fixed shutter speed; immediately thereafter (e.g., within 100 milliseconds) activates the light element to illuminate the calibration card behind the spray nozzle and triggers the optical sensor in the right coating thickness detection module to capture a second image at the fixed shutter speed; subtracts the baseline image from the second image to generate a fluorescence image; labels this fluorescence image with an illumination intensity of the light element, a shutter speed (or other imaging parameters) of the optical sensor, and a calibration zone identifier or other definition of a region on the calibration card represented in the fluorescence image; and stores this fluorescence image in local memory or in a remote database.

The controller can repeat this process to capture baseline and second image pairs throughout the calibration routine. For example, the controller can trigger the right coating thickness detection module to capture baseline and fluorescence image pairs in response to the focal axis of the optical sensor aligning with a center of a calibration zone on the calibration card as the system 100 moves the spray nozzle leftward across the calibration card.

Alternatively, the controller can continuously repeat this process—such as at a rate of 1 Hz or for 10 centimeters traversed by the spray nozzle as the system 100 moves the spray nozzle leftward across the calibration card.

Similarly, while driving the spray nozzle rightward across the calibration card, the controller can selectively: deactivate the light element and trigger the optical sensor in the left coating thickness detection module to capture a baseline image at the fixed shutter speed; immediately thereafter (e.g., within 100 milliseconds) activate the light element to illuminate the calibration card behind the spray nozzle and trigger the optical sensor in the left coating thickness detection module to capture a second image at the fixed shutter speed; subtract the baseline image from the second image to generate a fluorescence image; label this fluorescence image with an illumination intensity of the light element, a shutter speed (or other imaging parameters) of the optical sensor, and a calibration zone identifier or other definition of a region on the calibration card represented in the fluorescence image; and store this fluorescence image in local memory or in a remote database.

Furthermore, the computer system can combine discrete fluorescence images of the calibration card into one composite fluorescence image of the calibration card. For example, the controller can: spatially align these fluorescence images based on regions of the calibration card represented in these fluorescence images or based on positions of the spray nozzle (relative to the calibration card or in machine coordinates) when the system 100 captured the corresponding baseline and second image pairs; and initialize a composite fluorescence image for the calibration card. In particular, during the calibration routine, the system 100 may deposit coating onto regions of the calibration card over multiple passes such that the wet film thickness of the coating in regions of the calibration card increases over time and such that only subregions of the fluorescence images represent the true final fluorescence of the applied coating. Therefore, by storing the maximum (e.g., rather than an average) pixel value—of cospatial pixels in two or more discrete fluorescence images—in the composite fluorescence image, the controller can generate a composite fluorescence image that represents the maximum fluorescence of any discrete area on the calibration card during the calibration routine.

6.4 Manual Calibration Zone Coating Thickness Measurement

Once the system 100 terminates the calibration routine, the system 100 can cooperate with the operator to record contact-based thicknesses of the coating within calibration zones of the calibration card.

For example, after completing the calibration routine, the controller can transmit a notification—including a prompt or field to return manual coating thickness measurements for the calibration card—to a mobile device (e.g., a tablet, a system command portal) carried by the operator. The operator may then: open a calibration portal at the mobile device; apply a first wet film thickness gauge to the first calibration zone; read a first coating thickness from the first wet film thickness gauge; input this first coating thickness into a first input field associated with the first calibration zone within the calibration portal; and repeat this process to return a coating thickness measurement for each other calibration zone on the calibration card to the system 100.

Therefore, in this example, the operator may read identifiers from calibration zones on the calibration card and return manual wet film thickness measurements for these calibration zones to the system 100 based on these identifiers.

The controller can then record these wet film thickness measurements in association with their corresponding identifiers and/or calibration zone locations on the calibration card.

However, the system 100 can interface with the operator in any other way to record wet film thickness measurements for coating applied to calibration zones on the calibration card.

6.5 Coating Thickness Model: Coating Thickness+Fluorescence

Based on wet film thickness measurements supplied by the operator and fluorescence of the coating detected in images captured by the system 100 during the calibration routine, the controller can derive a coating thickness model that predicts coating thickness as a function of color values (i.e., fluorescence intensity) of pixels contained in a fluorescence image.

In one implementation, the controller: selects a first wet film thickness of the first calibration zone supplied by the operator; retrieves a first fluorescence image (or first region of the composite fluorescence image) corresponding to the first calibration zone; extracts a fluorescence value (e.g., an average pixel intensity) from the first fluorescence image; and pairs the first wet film thickness and the first fluorescence value. The controller: repeats this process for each other calibration zone on the calibration card; and then implements regression (e.g., "best-fit") techniques to derive a function (e.g., an algebraic or logarithmic function) that correlates pixel intensity in a fluorescence image to wet film thickness.

The controller can then store this function as a calibrated coating thickness model for application of the coating on the structure by the system 100.

In the variation of the calibration card that includes multiple substrate types and/or surface preparations, the controller can implement similar methods and techniques to derive a calibrated coating thickness model for each substrate type and surface preparation combination based on wet film thicknesses entered by the operator and fluorescence images generated by the system 100 when applying coating to the calibration card.

6.6 Fluorescent Imaging Parameters

In one variation, during the calibration routine, the system 100 captures multiple calibration images of each calibration zone with coating applied, such as: at a constant illumination intensity and over a range of different shutter speeds; or at a constant shutter speed and over a range of different illumination intensities. The system 100 can further identify a combination of illumination intensity and shutter speed that yields a fluorescent intensity at a target proportion (e.g., 60%) of the dynamic range of the optical sensor for the target coating thickness of the coating.

For example, the controller can select a particular illumination intensity and shutter speed that yields an average pixel intensity near "150"—for a pixel range between "0" and "255"—in a fluorescence image of a calibration zone corresponding to a measured coating thickness nearest the target applied coating thickness for the structure. The controller can then: derive the coating thickness model for the coating based on fluorescence images generated from baseline and second images captured according to these imaging parameters during the calibration routine; and set this illumination intensity and this shutter speed as imaging parameters for the system 100 during the coating application routine.

In the variation of the calibration card that includes multiple substrate types and/or surface preparations, the controller can implement similar methods and techniques to set fluorescence imaging parameters for each substrate type and surface preparation combination based on wet film thicknesses entered by the operator and fluorescence images generated by the system 100 when applying coating to the calibration card.

6.7 Coating Parameter Model

The controller can also derive an coating parameter model that predicts the coating thickness applied to a surface by the system 100 as a function of coating parameters executed by the system 100.

In one implementation, the controller: estimates a coating thickness applied to a first calibration zone on the calibration card based on the geometry of the spray nozzle and the coating flow rate, raster speed, standoff distance, and spray overlap parameters executed by the system 100 when applying coating to the first calibration zone; retrieves wet film thickness measured within the first calibration zone; calculates a first correction factor based on a difference between these estimated and measured coating thicknesses; and repeats this process for each other calibration zone.

In this implementation, the controller can then calculate an average of these correction factors and apply this average correction factor to coating thickness estimates calculated by the system 100 based on coating parameters during subsequent application of the coating on the structure.

Alternatively, the controller can then generate a multivariant model—that outputs a correction factor as a function of input coating parameters—based on these correction factors and the corresponding coating parameters executed by the system 100 during the calibration routine.

However, the controller can implement any other method or technique to derive an coating parameter model in any other way or in any other format.

6.8 Coating Thickness Model: Example

In one example shown in FIG. 3, the system 100 captures a first calibration image of a calibration card, such as via a camera arranged on the paint platform in response to receipt of a manual trigger from an operator after locating the calibration card facing the camera. The system 100 then: implements template matching, object recognition, computer vision, or other artificial intelligence techniques to detect the calibration card and discrete calibration zones on the calibration card in the calibration image; and autonomously sprays coating according to different coating parameters (e.g., raster speeds, offset distance, coating flow rate) to achieve different coating thicknesses in each calibration zone. In particular, the system 100 can detect a first calibration zone and a second calibration zone on the calibration card in the first calibration image, such as by: detecting individual optical fiducials (e.g., barcodes) adjacent each calibration zone depicted in the first calibration image; or detecting a global optical fiducial in the first calibration image and locating a mask—defined boundaries of the set of calibration zones—over the calibration card in first calibration image according to this global optical fiducial. The system 100 can also: retrieve nominal coating parameters for the coating; assign these nominal coating parameters—configured or predicted to yield a target thickness of the coating set for the structure—to a first or center calibration zone on the calibration card; and assign coating parameters configured or predicted to yield a greater and lesser thickness of the coating to other calibration zones on the calibration card.

The system 100 then implements methods and techniques described above to navigate the spray nozzle across the first calibration zone on the calibration card at a first speed and apply the coating to the first calibration zone on the calibration card via the spray nozzle according to the nominal coating parameters, thereby applying a first thickness of the coating to the first calibration zone predicted to approximate the target thickness of the coating set for the structure. The system 100 similarly: navigates the spray nozzle across the second calibration zone on the calibration card at a second speed—less than the first speed—and applies the coating to the second calibration zone on the calibration card via the spray nozzle according to a second set of the coating parameters, thereby applying a second thickness of the coating to the second calibration zone predicted to exceed the target thickness of the coating set for the structure; and/or navigates the spray nozzle across a third calibration zone on the calibration card at a third speed—greater than the first speed—and applies the coating to the third calibration zone on the calibration card via the spray nozzle according to a third set of the coating parameters, thereby applying a third coating thickness of the coating to the third calibration zone predicted to fall below the target thickness of the coating set for the structure; etc.

The system 100 can also implement methods and techniques described above to illuminate the first calibration zone on the calibration card and detect a first calibration intensity of light emitted or reflected by the coating on the first calibration zone on the calibration card, such as immediately after coating the first calibration zone or after coating all calibration zones on the calibration card. The system 100 similarly: illuminates the second calibration zone on the calibration card and detects a second calibration intensity of light emitted or reflected by the coating on the second calibration zone on the calibration card; and illuminates the third calibration zone on the calibration card and detects a third calibration intensity of light emitted or reflected by the coating on the third calibration zone on the calibration card; etc. The system 100 can thus store both a) coating parameters implemented by the system 100 to coat each calibration zone and b) the corresponding calibration intensities of light emitted or reflected by these calibration zones when illuminated with a controlled intensity of light at a known wavelength.

The operator may then: implement a wet film thickness gauge to manually measure a thickness of the coating in each calibration zone; and return these coating thicknesses to the system 100. In one implementation, the system 100 captures: a second calibration image of the calibration card after applying the coating—according to different coating parameters—to each calibration zone; serves the second calibration image to the operator, such via a native or browser-based application executing on a mounting bracket (e.g., a phone, a tablet) carried by the operator; prompts the operator to manually annotate each calibration zone depicted in the second calibration image with a corresponding coating thickness via the application; and links these coating thicknesses supplied by the operator with coating parameters and calibration intensities of corresponding calibration zones.

In another implementation, the operator physically annotates each calibration zone on the calibration card with a coating thickness, such as by writing a measured coating thickness adjacent each corresponding calibration zone. The system 100 then: captures a second calibration image of this annotated calibration card; implements computer vision techniques (e.g., optical character recognition) to read a coating thickness adjacent each calibration zone from the second calibration image; and links these coating thicknesses extracted from the second calibration image with coating parameters and calibration intensities of corresponding calibration zones.

The system 100 then generates a coating thickness function (or "model") based on: the first calibration intensity; the second calibration intensity; the first sample coating thickness; and the second sample coating thickness; etc. For example, the system 100 can implement regression techniques to derive a linear or non-linear function that represents a relationship between coating thickness and intensity of light—emitted or reflected by the coating—based on calibration intensities captured autonomously by the system 100 and coating thicknesses on calibration zones of the calibration card supplied by the operator.

The system 100 can similarly generate an coating parameter function (or "model") based on: the first set of the coating parameters; the second set of the coating parameters; the first sample coating thickness; and the second sample coating thickness; etc. For example, the system 100 can implement regression techniques to derive a linear or non-linear function that represents a relationship between coating thickness and raster speed, spray nozzle offset from a target surface, and/or coating volume flow rate based on coating thicknesses on calibration zones of the calibration card supplied by the operator and coating parameters implemented by the system 100 when applying coating to the calibration card.

Later, the system 100 can implement the coating thickness function to convert an intensity of light—emitted or reflected by a region of the structure—into a thickness of the coating present on the region of the structure. Similarly, the system 100 can implement the coating parameter function to select coating parameters for applying the coating to a region of the structure based on a target thickness of the coating assigned to the region of the structure.

6.9 Variation: Calibration on Target Surface

In one variation, the system 100: applies coating directly to the target surface on the structure rather than a calibration card during the calibration routine; interfaces with the operator to collect manual coating thickness measurements of the coating applied to the target surface on the structure during the calibration routine; and implements methods and techniques to derive the coating thickness and application models based on coating thickness measurements supplied by the operator and data collected automatically by the system 100 during the calibration routine.

7. Coating Application Routine

Blocks S110, S112, S120, S122, and S130 of the method S100 recite, during a coating period: navigating a spray nozzle across a region of a structure; applying a coating to the region of the structure via the spray nozzle; illuminating the coating applied to the region of the structure; detecting an intensity of light at the region of the structure; and converting the first intensity of light into a first coating thickness of the coating applied to the first region of the structure.

Generally, upon completion of the calibration routine and/or upon receipt of confirmation from the operator, the system 100 can autonomously execute a coating application routine to: apply the coating onto a set of target surfaces on the structure; irradiate these coated surfaces; capture fluorescence images of these target surfaces following application of the coating; extract fluorescence intensities of coatings on these target surfaces from these fluorescence images; and derive thicknesses of the coating on these target surfaces of the structure based on these fluorescence intensities and the coating thickness model described above, as shown in FIGS. 1 and 4.

Additionally or alternatively, upon completion of the calibration routine and/or upon receipt of confirmation from the operator, the system 100 can autonomously execute a coating application routine to: apply the coating onto target surfaces on the structure; irradiate these coated surfaces of the surface; capture fluorescence intensities of the coating on these target surfaces; and derive thicknesses of the coating on these individual target surfaces of the structure based on these fluorescence intensities and the coating thickness model described above.

Block S140 of the method S100 recites annotating a segment of a coating thickness map—corresponding to the region of the structure—according to the coating thickness. Generally, in Block S140, the controller can: generate a map of thicknesses of the coating—derived from these fluorescence images—applied across the structure; and/or implement closed-loop controls to modulate coating parameters executed by the system 100 to minimize a difference between a target coating thickness specified for the structure and coating thicknesses derived from fluorescence images of the structure; and/or selectively "retouch" (i.e., apply additional coating to) regions of the structure characterize by insufficient fluorescence-based coating thickness estimates or flag these region of the structure for manual touch-up, as shown in FIG. 2.

7.1 Coating Application

More specifically and as shown in FIGS. 2 and 4, the system 100 can execute methods and techniques described in U.S. Provisional Patent Application No. 63/333,093 to: load coating parameters; localize the system 100 relative to the structure; locate the system 100 adjacent a first zone of the structure (e.g., a six-foot-wide zone of the structure); raster the spray nozzle across this zone of the structure; detect target surfaces and keepout zones intersecting the spray field of the spray nozzle; and selectively activate the coating supply system to supply coating to the spray nozzle—and thus dispense coating onto this zone of the structure—based on proximity of target surfaces to the spray nozzle.

For example, in Blocks S110 and S112, the system 100 can: trigger a set of actuators within the system 100 to navigate the coating platform—supporting the spray nozzle—to a first pose facing a first target zone (e.g., a two-meter-wide, one-meter-tall area) on the structure; retrieve a first target coating thickness for the first target zone; implement the coating parameter function described above to calculate a set of coating parameters (e.g., target offset distance between the spray nozzle and the structure, target raster speed, target coating flow rate) predicted to yield the first target coating thickness; detect a distance from the spray nozzle to a surface of the structure within the first target zone via a depth sensor arranged on the coating platform; and trigger the actuators to advance or retract the spray nozzle on the coating platform toward the structure to locate the nozzle at the target offset distance from the surface of the structure. In this example, the system 100 can then: trigger the set of actuators to navigate the spray nozzle laterally across the coating platform to traverse a field of view of the spray nozzle across the first target zone on the structure; and concurrently trigger a coating sprayer (e.g., a pump interposed between a coating reservoir and the spray nozzle) to dispense the coating through the spray nozzle to apply the coating to the first coating zone via the spray nozzle.

While traversing the coating platform across the first coating zone, the system 100 can also implement closed-loop controls to: maintain the target offset distance between the spray nozzle and the structure; maintain the target raster speed; and/or maintain the target coating flow rate; etc.

The system 100 can implement similar methods and techniques to apply the coating to other coating zones on the structure.

7.2 Fluorescence Images

Furthermore, while driving the spray nozzle leftward across this first zone of the structure during this coating application routine, the system 100 can also execute methods and techniques described above to: deactivate the light element and trigger the optical sensor in the right coating thickness detection module to capture a baseline image (e.g., at a shutter speed automatically selected by the system 100 during the calibration routine as described above); immediately thereafter (e.g., within 100 milliseconds) activate the light element to illuminate a target surface on the structure behind the spray nozzle and trigger the optical sensor in the right coating thickness detection module to capture a second image (e.g., at the same shutter speed); subtract the baseline image from the second image to generate a fluorescence image; label this fluorescence image with an area on the structure represented in the fluorescence image; and store this fluorescence image in local memory or in a remote database.

Similarly, while driving the spray nozzle rightward across this first zone of the structure during this coating application routine, the system 100 can also execute methods and techniques described above to: deactivate the light element and trigger the optical sensor in the left coating thickness detection module to capture a baseline image (e.g., at a shutter speed automatically selected by the system 100 during the calibration routine as described above); immediately thereafter (e.g., within 100 milliseconds) activate the light element to illuminate a target surface on the structure behind the spray nozzle and trigger the optical sensor in the left coating thickness detection module to capture a second image (e.g., at the same shutter speed); subtract the baseline image from the second image to generate a fluorescence image; label this fluorescence image with an area on the structure represented in the fluorescence image; and store this fluorescence image in local memory or in a remote database.

7.3 Real-Time Coating Thickness Tracking and Closed-Loop Controls

Upon generating a fluorescence image during the coating application routine, the controller can: implement the coating thickness model to convert color intensities—stored in pixels in the fluorescence image—into a two-dimensional map of the coating thickness on a region of the structure represented in the fluorescence image; and then implement closed-loop controls to modify real-time coating parameters implemented by the system 100 to reduce differences between target and applied coating thicknesses.

In one example in which the system 100 rasters the spray nozzle horizontally and incrementally lowers the work platform between horizontal raster legs, the system 100 overlaps horizontal raster legs by a target spray overlap of 50%. In this example, the controller can: calculate an average color intensity of pixels within the upper half of the fluorescence image, which corresponds to a region of the target surface fully covered by the spray nozzle; convert this average color intensity into an average coating thickness according to the coating thickness model; increase the coating flow rate through the spray nozzle (and/or decrease the target standoff distance accordingly) if this average coating thickness is less than the target coating thickness for the structure; and decrease the coating flow rate through the spray nozzle (and/or increase the target standoff distance accordingly) if this average coating thickness is greater than the target coating thickness for the structure.

Alternatively in this example, the controller can: calculate an average color intensity within each row of pixels in the upper half of the fluorescence image; convert these average color intensities into average coating thicknesses according to the coating thickness model; and characterize variance across these average coating thicknesses. In this example, if the variance of these average coating thicknesses is low and these average coating thicknesses are less than the target coating thickness for the structure, the system 100 can increase the coating flow rate through the spray nozzle (and/or decrease the target standoff distance accordingly). Similarly, if the variance of these average coating thicknesses is low and these average coating thicknesses are greater than the target coating thickness for the structure, the system 100 can decrease the coating flow rate through the spray nozzle (and/or increase the target standoff distance accordingly). However, if the variance of these average coating thicknesses is high and inconsistent across the fluorescence image, the system 100 can: predict high spray nozzle wear; pause operation; and generate a prompt or command to replace the spray nozzle. Similarly, if the variance of these average coating thicknesses is high but consistent with peak coating thickness near the center and top edge of the fluorescence image, the system 100 can: increase the coating flow rate through the spray nozzle and maintain or increase the target standoff distance in order to increase coating application beyond the center to the spray field of the spray nozzle. Conversely, if the variance of these average coating thicknesses is high but consistent with peak coating thickness between the center and top edge of the fluorescence image, the system 100 can: decrease the coating flow rate through the spray nozzle and maintain or decrease the target standoff distance in order to reduce coating application beyond the center to the spray field of the spray nozzle.

However, the system 100 can implement any other method or technique to adjust coating parameters in real-time during the coating application routine based on fluorescence of the coating thus applied to the structure by the system 100.

7.4 Real-Time Touch-up

In one variation, the system 100 autonomously applies additional coating to a region of the structure within a target zone upon completing initial application of the coating on this target zone and in response to detecting insufficient paint thickness within this region of the structure. In particular, after completing a lateral (or vertical) traversal of the spray nozzle across a target zone on the structure, the system 100 can: selectively return the spray nozzle to a region within the zone exhibiting light fluorescence that indicates less than a minimum thickness of the coating is present on the region of the structure; and apply additional coating on this region of the structure in order to achieve at least the minimum thickness of the coating on this region of the structure.

In one implementation, the system 100: navigates the spray nozzle across a first target zone on the structure at a first raster speed during a first coating period; sprays the coating onto the first target zone at a target flow rate—such as predicted by the coating parameter function described above—during the first coating period; irradiates the coating applied to a first region of the structure within the first target zone; interprets an initial thickness of the coating thus applied to the first region of the structure based on an intensity of light emitted by the coating in this region of the structure; and repeats this process for other regions of the structures within the first target zone. Then, in response to the first coating thickness of the first region of the structure falling below a threshold coating thickness and after completing lateral traversal of the spray nozzle across the first zone, the system 100: calculates a thickness difference between the first coating thickness and the threshold coating thickness; calculates a second raster speed—greater than the first raster speed—based on this thickness difference and the coating thickness function described above; renavigates the spray nozzle back to and across the first region of the structure at the second speed; and sprays the coating onto the first region of the structure at the target flow rate in order to add additional coating thickness to the first region of the structure.

In this variation, the system 100 can implement methods and techniques described above to: re-irradiate the first region of the structure; capture a fluorescence image or a one-dimensional light intensity representing fluorescence of the coating the first region of the structure; estimate the thickness of the coating on the first region of the structure based on this fluorescence image or light intensity; and record this coating thickness in a corresponding area of the coating map associated with the structure.

7.5 Coating Thickness Map

The system 100 can additionally or alternatively implement methods and techniques described above to assemble fluorescence images captured during the coating application routine into a composite fluorescence image based on positions of the spray nozzle relative to the structure when the system 100 captured corresponding baseline and second images. In particular, the controller can assemble these fluorescence images into a composite fluorescence image: representing the whole structure; and containing maximum color intensity values of cospatial pixels in these fluorescence images (i.e., pixels representing cospatial areas on the structure). The computer system can then implement the coating thickness model to convert pixel values in the composite fluorescence image into a map of the coating thickness across the structure.

For example, the system 100 can: execute the foregoing methods and techniques to autonomously apply an exterior paint to a first wall and a second wall of a building; initialize a paint thickness map including a three-dimensional representation of the first and second walls of the building; annotate a first area of the paint thickness map—corresponding to a first region of the structure on the first wall of the building—with a first coating thickness of the exterior paint detected on the first region of the structure based on fluorescence of this paint; annotate a second area of the paint thickness map—corresponding to a second region of the structure on the second wall of the building—with a second coating thickness of the exterior paint detected on the second region of the structure based on fluorescence of this paint as shown in FIG. 2; and repeat this process for other regions on the first and second walls of the structure painted by the system 100.

7.6 Post-Application Inspection

The controller (or a remote computer system) can then: flag regions of the structure corresponding to low coating thicknesses in this coating thickness map for "touch up"; and flag regions of the structure corresponding to excess coating thicknesses in this coating thickness map for inspection for coating runs and sags, shown in FIGS. 2 and 4.

In one implementation, the system 100: navigates the spray nozzle across a first target zone on the structure at a first raster speed during a first coating period; sprays the coating onto the first target zone at a target flow rate—such as predicted by the coating parameter function described above—during the first coating period; irradiates the coating applied to a first region of the structure within the first target zone; interprets an initial thickness of the coating thus applied to the first region of the structure based on an intensity of light emitted by the coating in this region of the structure; and repeats this process for other region of the structures within the first target zone. Then, in response to the first coating thickness of the first region of the structure falling below a minimum coating thickness, the system 100 can annotate a first area of the coating thickness map—corresponding to the first region of the structure—with a flag for manual repair of thin coating within the first region of the structure, such as by manually spraying additional coating over the first region of the structure or by re-deploying the system 100 to autonomously spray additional coating over the first region of the structure.

Alternatively, in this implementation, in response to the first coating thickness falling between the minimum coating thickness and a maximum coating thickness, the system 100 can annotate the first area of the coating thickness map—corresponding to the first region of the structure—with confirmation of the coating application.

Yet alternatively, in response to the first coating thickness exceeding the maximum coating thickness, the system 100 can annotate the first area of the coating thickness map—corresponding to the first region of the structure—with a flag for manual inspection of a paint sag within the first region of the structure.

8. Coating Thickness Model Selection

In one variation in which the structure includes multiple different substrates and/or surface preparations, the system 100 can execute a calibration routine to generate a calibrated coating thickness model for each substrate type and surface preparation combination. The system 100 can then selectively implement these coating thickness models to estimate coating thicknesses applied to different surfaces on the structure.

For example, the controller can implement artificial intelligence, perception modeling, material recognition, template matching, and/or other methods and techniques to identify or predict a material type and/or surface preparation of a target surface depicted in a baseline image captured by the system 100 during the coating application routine. Alternatively, the controller can: access a map or elevation model of the structure annotated with substrates and surface preparations throughout the structure; and read substrate and surface preparation combinations for regions of the structure from the map or elevation model. The controller can then select and implement coating thickness models to convert a pixel value into a coating thickness value based on a substrate and/or surface preparation of a region of the structure represented by the pixel in a fluorescence image or composite fluorescence image.

9. One-Dimensional Fluorescence Intensity

In one variation, each coating thickness detection module in the system 100 (e.g., arranged on the coating platform on the left and right sides of the spray nozzle) includes: a one-dimensional optical emitter (e.g., a light element) configured to output radiation (e.g., infrared light, ultraviolet light) at a first wavelength that causes fluorescence material in the coating to fluoresce; and a one-dimensional optical detector defining a field of view adjacent or overlapping the field of view of the optical emitter and configured to detect light emitted by the fluorescence material in the coating.

In this variation, while driving the spray nozzle leftward across a first zone of the structure during the coating application routine described above, the system 100 can: deactivate the optical emitter and trigger the optical detector in the right coating thickness detection module to capture a baseline light intensity; activate the optical emitter to illuminate an area on the surface on the structure behind the spray nozzle and concurrently trigger the optical detector in the right coating thickness detection module to capture a second light intensity once the spray nozzle and the right coating thickness detection module have moved leftward by half of a target pitch distance (e.g., six inches); subtract the baseline light intensity from the second light intensity to generate a fluorescence intensity; associate this fluorescence intensity with an area on the structure represented in the baseline and second light intensity values; store this fluorescence intensity in an area in the coating map corresponding to this area on the structure; and repeat this process at a target frequency corresponding to the target pitch distance (e.g., once per second for a spray nozzle raster speed of one linear foot per second to yield a target pitch distance of one linear foot) to populate the coating map with coating thicknesses in discrete, corresponding areas on the structure offset by the target pitch distance and coated by the system 100 during this leftward traversal of the spray nozzle.

Similarly, while driving the spray nozzle rightward across a second zone of the structure during this coating application routine, the system 100 can similarly: deactivate the optical emitter and trigger the optical detector in the left coating thickness detection module to capture a baseline light intensity; activate the optical emitter to illuminate an area on the surface on the structure behind the spray nozzle and concurrently trigger the optical detector in the left coating thickness detection module to capture a second light intensity once the spray nozzle and the left coating thickness detection module have moved rightward by half of the target pitch distance; subtract the baseline light intensity from the second light intensity to generate a fluorescence intensity; associate this fluorescence intensity with an area on the structure represented in the baseline and second light intensity values; store this fluorescence intensity in an area in the coating map corresponding to this area on the structure; and repeat this process at the target frequency described above to populate the coating map with coating thicknesses in discrete, corresponding areas on the structure offset by the target pitch distance and coated by the system 100 during this rightward traversal of the spray nozzle.

10. Coating Thickness by Fluorescence

Therefore, the system 100 can spray a coating—including fluorescent particles configured to fluoresce at a first wavelength when illuminated with light at a target wavelength—onto the structure in Block S112. The system 100 can then: illuminate a first region of the structure with a target intensity of light at the target wavelength in Block S120, such as a nominal (or "fixed") intensity or a target intensity corrected for (e.g., proportional to) an ambient light level at the target wavelength detected by an optical sensor proximal the spray when facing the first region of the structure; and detect a first intensity of light at the first wavelength emitted by fluorescent particles in the coating—thus applied to the first region of the structure—when illuminated with light at the target wavelength in Block S122. The system 100 can then calculate a first coating thickness of the coating applied to the first region of the structure: proportional to the first intensity of light, in the first wavelength, fluoresced by the coating; and inversely proportional to the target intensity of light, at the target wavelength, with which the system 100 illuminated the first region of the structure when detecting the first intensity, as shown in FIG. 4.

Additionally or alternatively, the system 100 can: detect an initial intensity of light at the first wavelength emitted by fluorescent particles in the coating—thus applied to the first region of the structure—prior to or after active illumination by the system 100; and calculate the first coating thickness of the coating applied to the first region of the structure proportional to a difference between the first intensity and the initial intensity of light in the first wavelength.

Additionally or alternatively, the system 100 can: illuminate the first region of the structure with the target intensity of light at the target wavelength prior to application of the coating (e.g., within two seconds of applying the coating the first region of the structure); detect an initial intensity of light at the first wavelength emitted or reflected by the first region of the structure prior to application of the coating; apply the coating to the first region of the structure in Block S112; illuminate the first region of the structure with the target intensity of light at the target wavelength in Block S120; and detect the first intensity of light at the first wavelength emitted by fluorescent particles in the coating—thus applied to the first region of the structure—when illuminated with light at the target wavelength in Block S122. The system 100 can then calculate the first coating thickness of the coating applied to the first region of the structure proportional to a difference between the first intensity and the initial intensity of light in the first wavelength. For example, while moving the spray nozzle leftward across a target zone on the structure in Block S110, the system 100 can: illuminate the first region of the structure and detect the initial intensity of light at the first wavelength emitted or reflected by the first region of the structure via a left optical emitter and a left optical detector, respectively, arranged on a left side of (or "ahead of," "leading") the spray nozzle; and then illuminate the first region of the structure and detect a first intensity of light at the first wavelength emitted or reflected by the coating applied to the first region of the structure via a right optical emitter and a right optical detector, respectively, arranged on a right side of (or "behind," "trailing") the spray nozzle.

10.1 Coating Thickness by Phosphorescence

Figure 5:
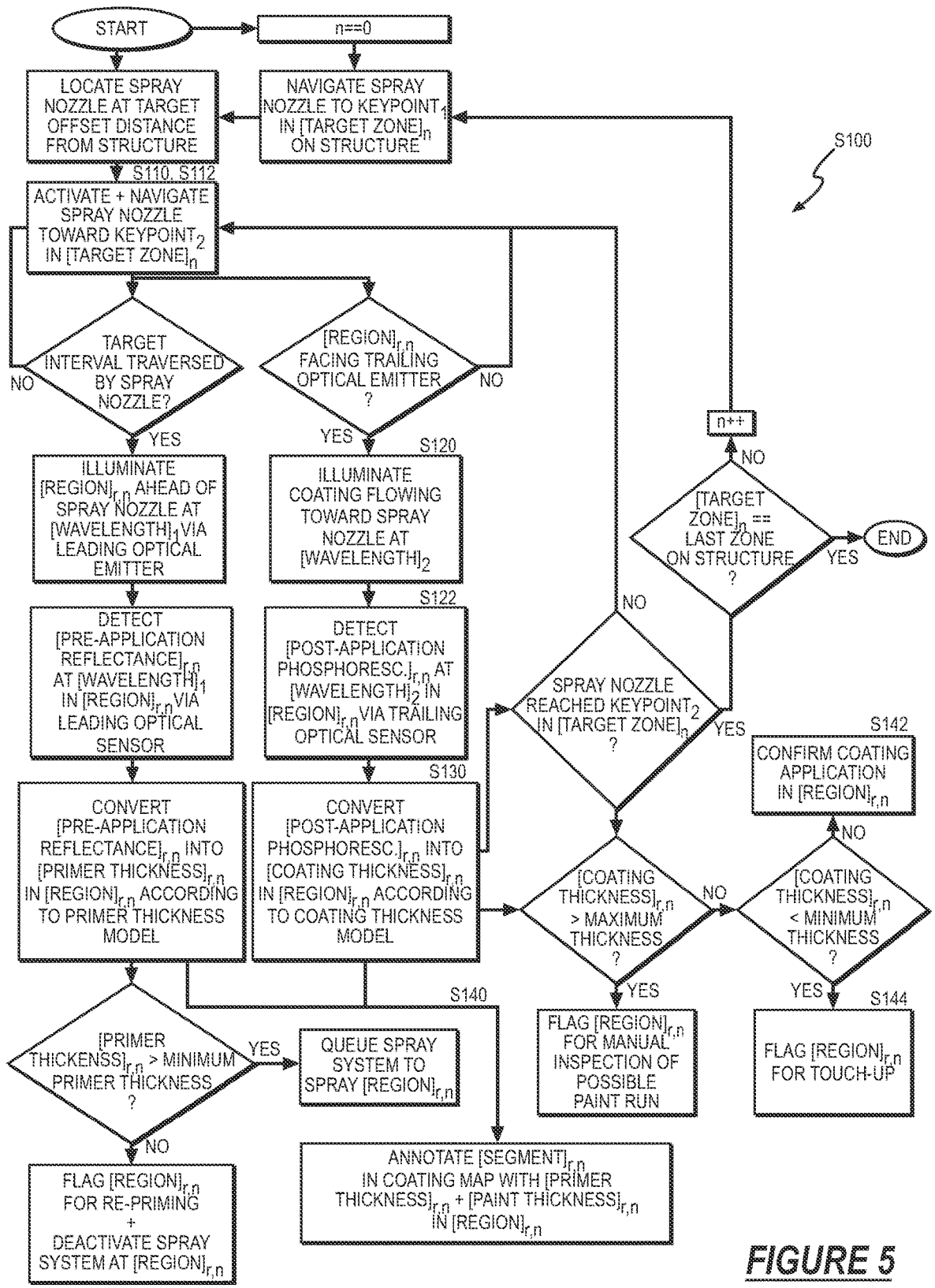
FIG. 5 is a flowchart representation of one variation of the method.

In one variation shown in FIG. 5, the system 100: applies a coating containing phosphorescent particles configured to phosphoresce at a first wavelength after absorbing energy supplied by the system 100; detects an intensity of light at the first wavelength emitted by phosphorescent particles in the coating following application of the coating onto a region of the structure; and interprets a thickness of the coating on this region of the structure based on the intensity of light at the first wavelength phosphoresced by the coating.

In particular, fluorescent particles: may immediately fluoresce at a first wavelength when illuminated with radiation at a second (herein "target") wavelength; may fluoresce at an intensity proportional to real-time illumination intensity; and may rapidly cease fluorescence when no longer illuminated with radiation at the second wavelength. Conversely, phosphorescent particles may phosphoresce at a first wavelength when illuminated with radiation at a second (herein "target") wavelength; may phosphoresce at an intensity proportional to energy absorbed from the radiation source of time; and may continue to phosphoresce after the radiation source is removed. Therefore, in this variation, the system 100 can: irradiate the coating prior to applying the coating to the structure, thereby energizing phosphorescent particles in the coating prior to application on the structure and in preparation for detecting phosphorescent intensity of the coating once applied to the structure; or irradiate the coating over a period of time after applying the coating to the structure, thereby energizing phosphorescent particles in the coating in preparation for detecting phosphorescent intensity of the coating once applied to the structure.

In one implementation, the system 100 includes a radiation chamber interposed between a coating reservoir (e.g., a "paint bucket" or "paint barrel") and the spray nozzle. For example, the radiation chamber can include: a transparent (e.g., glass) manifold defining a thin, wide internal cross-section; and light element facing a wide section of the transparent manifold and configured to irradiate paint passing (or "pumped") through the transparent manifold. In this implementation, the system 100 can: pump the coating—including phosphorescent particles—through the chamber toward the spray nozzle at a nominal flow rate; irradiating the radiation chamber at a radiation flux corresponding to (e.g., proportional to) the target flow rate in Block S120; detect a first intensity of light at the first wavelength emitted by phosphorescent particles in the coating once applied to the first region of the structure in Block S122; and calculate the first coating thickness of the coating applied to the first region of the structure in Block S130 proportional to the first intensity of light in the first wavelength and inversely proportional to the radiation flux with which the system 100 energized the coating.

In another implementation, the system 100 includes a light element adjacent the spray nozzle and configured to irradiate atomized coating particles—exhibiting high surface area to volume ratios and therefore high rates of radiation absorption—exiting the spray nozzle. In this implementation, the system 100 can: spray the coating through the spray nozzle onto the first region of the structure in Block S112; and concurrently irradiate atomized coating particles exiting the spray nozzle in Block S120, thereby energizing the coating when airborne and before application onto the first region of the structure. The system 100 can then detect a first intensity of light at the first wavelength emitted by phosphorescent particles in the coating immediately after application onto the first region of the structure in Block S122; and calculate the first coating thickness of the coating applied to the first region of the structure in Block S130 based on the first intensity of light in the first wavelength.

Furthermore, in this variation, the system 100 can implement methods and techniques described above to interpret a thickness of the coating applied to a region of the structure based on phosphoresce of the region of the structure prior to application of the coating and/or based on intensity of ambient light, etc.

However, the system 100 can energize phosphorescent particles in the coating in any other way and implement any other method or technique to interpret a thickness of the coating applied to a region of the structure based on phosphoresce of the coating.

10.2 Coating Thickness by Absorption

Figure 6:
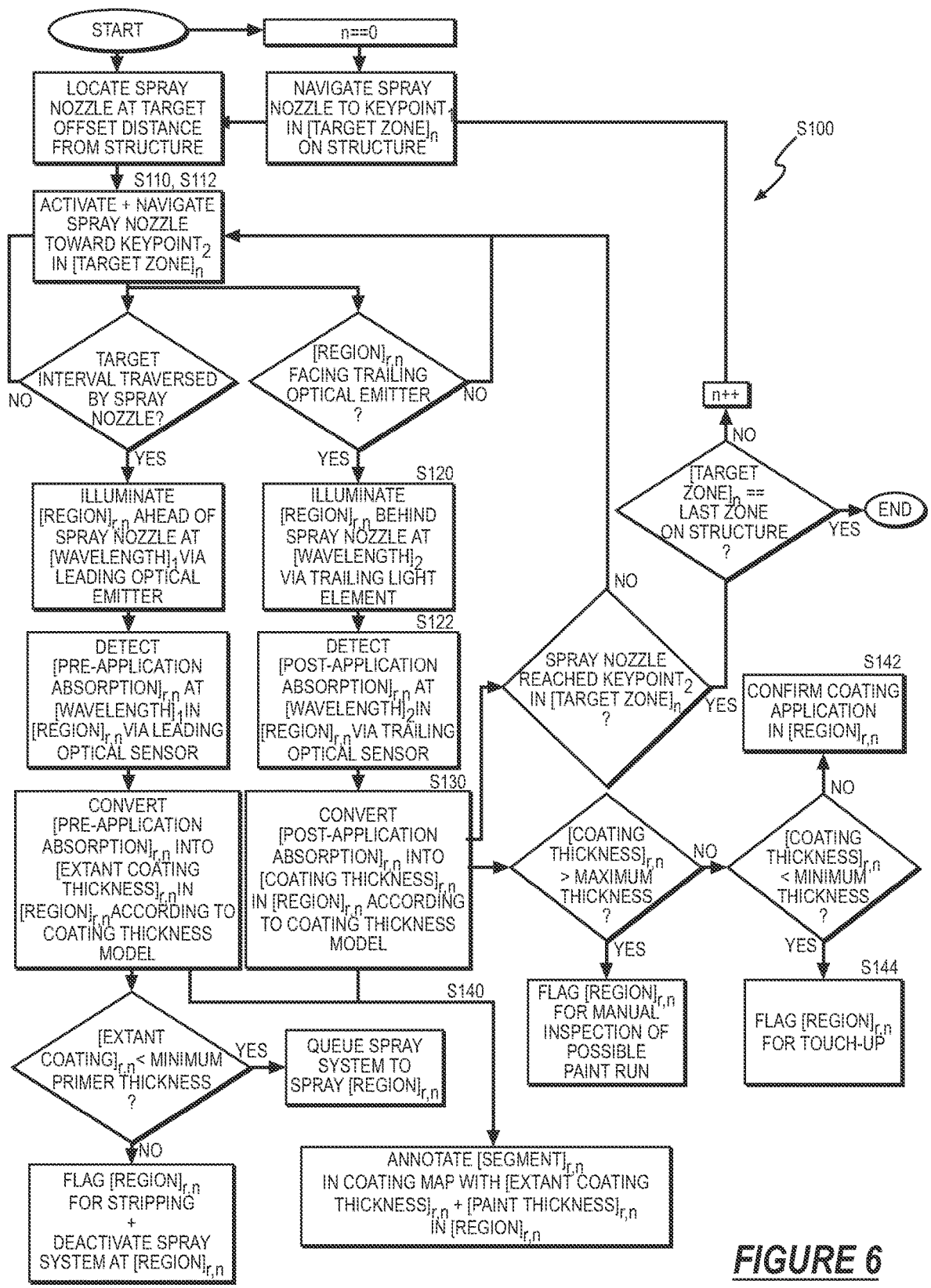
FIG. 6 is a flowchart representation of one variation of the method.

In another variation shown in FIG. 6, the system 100: applies a coating containing particles configured to selectively or preferentially absorb light at a particular wavelength; illuminates the coating at the particular wavelength once applied to a region of the structure; detects an intensity of light at the particular wavelength reflected by the coating following application of the coating onto the region of the structure; and interprets a thickness of the coating on this region of the structure based on the intensity of light at the particular wavelength thus reflected by the coating.

In one implementation, the coating includes dye particles configured to absorb near-infrared light. For example, the dye particles can define narrow notch absorbers that selectively absorb (or "attenuate") a narrow range of near-infrared wavelengths containing the particular wavelength. Accordingly, in this implementation, the system 100 can: illuminate the coating—applied to a region of the structure—with light at the particular wavelength; detect an intensity of light at the particular wavelength reflected by the coating on the region of the structure; and interpret a thickness of the coating on the region of the structure based on the intensity of light at the particular wavelength thus reflected by the coating.

For example, the system 100 can: spray the coating—including absorber particles configured to absorb light in a first wavelength—onto a first region of the structure via the spray nozzle in Block S112; illuminate the first region of the structure with a target intensity of light at the first wavelength in Block S120; detect a first intensity of light at the first wavelength absorbed by particles in the coating in Block S122; and calculate a first coating thickness of the coating applied to the first region of the structure a) inversely proportional to the first intensity of light in the first wavelength and b) proportional to the target intensity of light at the first wavelength.

Furthermore, in this variation, the system 100 can implement methods and techniques described above to interpret a thickness of the coating applied to a region of the structure based on absorption of light at the particular wavelength within the region of the structure prior to application of the coating and/or based on intensity of ambient light, etc.

However, the system 100 can implement any other method or technique to: characterize absorption of a light at a particular wavelength by the coating once applied to a region of the structure; and interpret a thickness of this coating based on such absorption of light at the particular wavelength by the coating.

11. Premixed Paint: Coating Model by Batch

In one implementation, the system 100 applies the coating—premixed with fluorescence, phosphorescent, absorber, and/or other particles in batches—to the structure. In this variation, the system 100 can access or generate a coating thickness model for each batch of the coating.

For example, the system 100 can: pump the coating—from a first container corresponding to a first batch of the coating—through the spray nozzle and onto the first region of the structure in Block S112; retrieve (or generate, as described above) a first coating model defining a first relationship between intensity of light and coating thickness for the first batch of the coating; and calculate a first coating thickness of the coating on the first region of the structure based on a first intensity of light emitted or reflected by the coating and the first coating model in Block S130. In this example, the system 100 can similarly: pump the coating—from a second container corresponding to a second batch of the coating—through the spray nozzle and onto the second region of the structure in Block S112; retrieve (or generate, as described above) a second coating model defining a second relationship between intensity of light and coating thickness for the second batch of the coating; and calculate a second coating thickness of the coating on the second region of the structure based on a second intensity of light emitted or reflected by the coating and the second coating model in Block S130.

11.1 Real-time Material Metering

Conversely, the system 100 can meter fluorescence, phosphorescent, absorber, and/or other particles into the coating during operation, such as by injecting these particles into the coating upstream of the spray nozzle. For example, the system 100 can include a venturi: arranged upstream of the nozzle or integral with the nozzle; coupled to a particle reservoir; and configured to meter particles from the particle reservoir into coating flowing through the venturi at a rate proportional to a flow rate of the coating through the venturi.

!In one example, the system 100: accesses a coating model defining a first relationship between fluorescence intensity and coating thickness for a target proportion of a fluorescent material in the coating and a target illumination intensity at a target illumination wavelength; and meter the fluorescent material into a feed line—supplying coating from a coating reservoir to the spray nozzle—according to the target proportion when applying the coating to a first region of the structure in Block S112. The system 100 can then: illuminate the first region of the structure with light at the target illumination wavelength and at the target illumination intensity in Block S120; detect a first intensity of light emitted by the fluorescent material in the coating applied to the first region of the structure in Block S122; and calculate a first coating thickness of the coating applied to the first region of the structure based on the first intensity of light and the coating model.

12. Substrate Quality Verification

In one variation, the system 100 implements similar methods and techniques to characterize a quality of an existing coating (e.g., a primer, a layer of paint previously applied) on the structure—based on intensity of emitted or reflected light on the structure—prior to applying the coating.

12.1 Primer+Recoating

In one implementation shown in FIG. 5, the system 100 verifies sufficient thickness of a primer previously applied to the structure based on intensity of light emitted from or reflected by the primer.

In this implementation, prior to applying the coating to the first region of the structure, the system 100 can: illuminate the first region of the structure; detect an initial intensity of light at the first region of the structure; and convert this initial intensity of light into an initial coating thickness of an existing coating (e.g., a primer) present on the first region of the structure. In response to the initial coating thickness of the existing coating in the first region of the structure exceeding a minimum existing coating thickness (e.g., a preset minimum primer thickness), the system 100 then applies the coating to the first region of the structure. Conversely, in response to the initial thickness of the existing coating in the first region of the structure falling below the minimum existing coating thickness, the system 100 can flag a first segment of the coating thickness map—corresponding to the first region of the structure—with a prompt to repair (e.g., recoat, reprime) the first region of the structure prior to application of the coating.

Furthermore, in this implementation: the existing coating (e.g., a primer) can be configured to fluoresce at a first wavelength in response to illumination in a second wavelength; and the (new) coating (e.g., a paint) can be configured to fluoresce at a third wavelength different from the first wavelength in response to illumination in a fourth wavelength different from the second wavelength. Therefore, the system 100 can: project light at the second wavelength onto the existing coating in a first region of the structure; detect a first intensity of light at the first wavelength fluoresced by the coating; and convert the first intensity of light at the first wavelength into a first coating thickness of the existing coating. If this first coating thickness of the existing coating exceeds the minimum existing coating thickness assigned to the existing coating, the system 100 can: apply the coating to the first region of the structure in Block S112; project light at the third wavelength onto the first region of the structure in Block S120; detect a second intensity of light at the third wavelength fluoresced by the coating in Block S122; and verify a thickness of the coating thus applied to the first region of the structure based on the second intensity of light at the third wavelength in Block S130.

For example, while moving the spray nozzle leftward across a target zone on the structure in Block S110, the system 100 can: illuminate the first region of the structure with light in the second wavelength and detect the first intensity of light at the first wavelength fluoresced by the existing coating on first region of the structure via a left optical emitter and a left optical detector, respectively, arranged on a left side of (or "ahead of," "leading") the spray nozzle; and convert the first intensity of light at the first wavelength into a coating thickness of the existing coating in (near) real-time. Then, if the coating thickness of the existing coating exceeds the minimum existing coating thickness, the system 100 can selectively activate the spray system to spray the coating as the spray nozzle passes the first region of the structure. The system 100 can then: illuminate the first region of the structure with light at the fourth wavelength and detect a second intensity of light at the third wavelength fluoresced by the (new) coating via a right optical emitter and a right optical detector, respectively, arranged on a right side of (or "behind," "trailing") the spray nozzle; convert the second intensity of light at the third wavelength into a coating thickness of the (new) coating in (near) real-time; and annotate a first segment of the paint map—corresponding to the first region of the structure—with the coating thicknesses of the both existing and new coatings (e.g., the primer applied previously and the paint layer applied thereover by the system 100).

12.2 Stripping+Reconditioning

In a similar implementation shown in FIG. 6, the system 100 can verify that a previous coating was sufficiently or fully removed.

In this implementation, prior to applying the coating to the first region of the structure, the system 100 can: illuminate the first region of the structure; detect an initial intensity of light at the first region of the structure; and convert this initial intensity of light into an initial coating thickness of an existing coating (e.g., an old paint layer) present on the first region of the structure. In response to the initial coating thickness of the existing coating in the first region of the structure falling below a maximum existing coating thickness (e.g., a preset maximum thickness corresponding to sufficient remover of paint), the system 100 then applies the coating to the first region of the structure. Conversely, in response to the initial thickness of the existing coating in the first region of the structure falling exceeding the maximum existing coating thickness, the system 100 can flag a first segment of the coating thickness map—corresponding to the first region of the structure—with a prompt to repair (e.g., strip, sand, etch, media-blast) the first region of the structure prior to application of the coating.

Furthermore, in this implementation: the existing coating may fluoresce at a first wavelength in response to illumination in a second wavelength; and the (new) coating (e.g., a paint) can be configured to fluoresce at a third wavelength different from the first wavelength in response to illumination in a fourth wavelength different from the second wavelength. Therefore, the system 100 can: project light at the second wavelength onto the existing coating in a first region of the structure; detect a first intensity of light at the first wavelength fluoresced by the coating; and convert the first intensity of light at the first wavelength into a first coating thickness of the existing coating. If this first coating thickness of the existing coating is less than the maximum existing coating thickness assigned to the existing coating, the system 100 can: apply the coating to the first region of the structure in Block S112; project light at the third wavelength onto the first region of the structure in Block S120; detect a second intensity of light at the third wavelength fluoresced by the coating in Block S122; and verify a thickness of the coating thus applied to the first region of the structure based on the second intensity of light at the third wavelength in Block S130.

For example, while moving the spray nozzle leftward across a target zone on the structure in Block S110, the system 100 can: illuminate the first region of the structure with light in the second wavelength and detect the first intensity of light at the first wavelength fluoresced by the existing coating on first region of the structure via a left optical emitter and a left optical detector, respectively, arranged on a left side of (or "ahead of," "leading") the spray nozzle; and convert the first intensity of light at the first wavelength into a coating thickness of the existing coating in (near) real-time. Then, if the coating thickness of the existing coating is less than the maximum existing coating thickness, the system 100 can selectively activate the spray system to spray the coating as the spray nozzle passes the first region of the structure. The system 100 can then: illuminate the first region of the structure with light at the fourth wavelength and detect a second intensity of light at the third wavelength fluoresced by the (new) coating via a right optical emitter and a right optical detector, respectively, arranged on a right side of (or "behind," "trailing") the spray nozzle; convert the second intensity of light at the third wavelength into a coating thickness of the (new) coating in (near) real-time; and annotate a first segment of the paint map—corresponding to the first region of the structure—with the coating thicknesses of the both existing and new coatings (e.g., the previous paint layer and the paint layer applied thereover by the system 100).

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   during a first coating period:
      navigating a spray nozzle across a first region of a structure; and
      applying a coating to the first region of the structure via the spray nozzle;
      deactivating an optical emitter arranged adjacent the spray nozzle at a first time;
      accessing a baseline image of the first region captured by an optical sensor at the first time;
      oat approximately the first time:
         activating the optical emitter to illuminate the first region of the structure behind the spray nozzle; and
         accessing a first image of the first region captured by an optical sensor;
   generating a normalized image of the first region of the structure, representing fluorescent intensity of the coating corrected for incident ambient light, by subtracting the baseline image from the first image;

calculating an average color intensity of pixels within the normalized image;
converting the average color intensity of pixels into average a first coating thickness of the coating applied to the first region of the structure;
in response to the first coating thickness exceeding a maximum coating thickness, storing a first flag for inspection of a paint sag within the first region of the structure;
during a second coating period:
  navigating the spray nozzle across a second region of a structure;
  applying the coating to the second region of the structure via the spray nozzle;
illuminating the coating applied to the second region of the structure;
detecting an intensity of light at the second region of the structure;
converting the intensity of light into a second coating thickness of the coating applied to the second region of the structure; and
in response to the second coating thickness falling below a minimum thickness, storing a second flag for recoating the second region of the structure.

2. The method of claim 1:
wherein storing the first flag for inspection of the paint sag within the first region of the structure comprises in response to the first coating thickness exceeding the maximum coating thickness:
  access a coating thickness map representing the structure; and
  annotating a first segment of a coating thickness map, corresponding to the first region of the structure, with the first flag for inspection of the paint sag within the first region of the structure; and
wherein storing the second flag for recoating the second region of the structure comprises in response to the third coating thickness falling below the minimum coating thickness, annotating a second segment of the coating thickness map, corresponding to the second region of the structure, with the second flag for repair of thin coating within the second region of the structure.

3. The method of claim 1:
further comprising during the second coating period:
  at an optical detector, capturing a baseline light intensity of the second region at a second time; and
  at approximately the first second time:
    at the optical emitter, illuminating the second region of the structure behind the spray nozzle;
    at the optical detector, capturing a second light intensity of the second region of the structure;
    generating a fluorescence intensity of the second region of the structure based on the baseline light intensity and the fluorescence intensity;
wherein converting the intensity of light into the second coating thickness comprises converting the fluorescence intensity into the second coating thickness of the coating applied to the second region of the structure; and
further comprising annotating a first segment of a coating thickness map, corresponding to the second region of the structure, according to the second coating thickness and the fluorescence intensity.

4. The method of claim 1:
wherein applying the coating to the first region of the structure comprises applying the coating to the first region of the structure via the spray nozzle at a first coating flow rate;
further comprising:
  accessing a coating thickness model linking fluorescence intensity and coating thickness for the coating;
wherein converting the average color intensity of pixels into the first coating thickness comprises converting the average color intensity of pixels into the first coating thickness according to the coating thickness model; and
further comprising:
  in response to the average coating thickness falling below a target coating thickness for the structure, calculating a second coating flow rate, less than the first coating flow rate, for the spray nozzle; and
  re-applying the coating to the first region of the structure via the spray nozzle at the second coating flow rate.

5. The method of claim 1:
wherein navigating the spray nozzle across the first region of the structure comprises:
  via a set of actuators, navigating a coating platform, comprising the spray nozzle, to a first pose facing a first target zone on the structure;
  via a depth sensor arranged on the coating platform, detecting a distance from the spray nozzle to a surface of the structure;
  via the set of actuators, advancing the spray nozzle on the coating platform to locate the nozzle at a target offset distance from the surface of the structure; and
  via the set of actuators, navigating the spray nozzle laterally across the coating platform at a first speed to traverse a field of view of the spray nozzle across the first target zone on the structure;
wherein applying the coating to the first region of the structure comprises:
  while navigating the spray nozzle laterally across the coating platform, activating a coating sprayer to dispense the coating through the spray nozzle and apply the coating to the first coating zone via the spray nozzle, the first coating zone comprising the first region of the structure;
wherein navigating the spray nozzle across the second region of the structure comprises:
  via the set of actuators, navigating the coating platform to a second pose facing a second target zone on the structure;
  via the depth sensor, detecting a second distance from the spray nozzle to the surface of the structure;
  via the set of actuators and based on the second distance, advancing the spray nozzle on the coating platform to locate the nozzle at the target offset distance from the surface of the structure; and
  via the set of actuators, navigating the spray nozzle laterally across the coating platform at the first speed to traverse the field of view of the spray nozzle across the second target zone on the structure; and
wherein applying the coating to the second region of the structure comprises:
  while navigating the spray nozzle laterally across the coating platform, activating the coating sprayer to apply the coating to the second coating zone via the spray nozzle, the second coating zone comprising the second region of the structure.

6. The method of claim 5, further comprising, during the second coating period:

calculating a thickness difference between the first coating thickness and the minimum coating thickness;

calculating a second speed, greater than the first speed, based on the thickness difference;

via the set of actuators, navigating the coating platform to a third pose facing the second region of the structure;

via the set of actuators and based on the second distance, advancing the spray nozzle on the coating platform to locate the nozzle at the target offset distance from the surface of the structure;

via the set of actuators, renavigating the spray nozzle laterally across the coating platform at the second speed to traverse the field of view of the spray nozzle across the second region of the structure; and while renavigating the spray nozzle laterally across the coating platform, activating the coating sprayer to re-apply the coating to the second region of the structure.

7. The method of claim 1:

further comprising:

capturing a first calibration image of a calibration card;

detecting a first calibration zone and a second calibration zone on the calibration card in the first calibration image;

navigating the spray nozzle across the first calibration zone on the calibration card at a first speed;

applying the coating to the first calibration zone on the calibration card via the spray nozzle;

illuminating the first calibration zone on the calibration card;

detecting a first calibration intensity of light, emitted by the coating, at the first calibration zone on the calibration card;

navigating the spray nozzle across the second calibration zone on the calibration card at a second speed different from the first speed;

applying the coating to the second calibration zone on the calibration card via the spray nozzle;

illuminating the second calibration zone on the calibration card;

detecting a second calibration intensity of light, emitted by the coating, at the second calibration zone on the calibration card;

receiving a first sample coating thickness of the coating on the first calibration zone on the calibration card measured manually by an operator;

receiving a second sample coating thickness of the coating on the second calibration zone on the calibration card measured manually by the operator; and generating a coating thickness function representing a relationship between coating thickness and intensity of light based on:
the first calibration intensity;
the second calibration intensity;
the first sample coating thickness; and
the second sample coating thickness; and wherein converting the intensity of light into the second coating thickness comprises calculating the second coating thickness based on the intensity of light and the coating thickness function.

8. The method of claim 1:

further comprising, prior to applying the coating to the second region of the structure:

illuminating the second region of the structure;

detecting a second intensity of light at the second region of the structure; and converting the second intensity of light into a third coating thickness of an existing coating present on the second region of the structure;

wherein applying the coating to the second region of the structure comprises applying the coating to the second region of the structure in response to the third coating thickness of the existing coating in the second region of the structure falling below a maximum existing coating thickness; and further comprising, prior to applying the coating to a third region of the structure:

illuminating the third region of the structure;

detecting a third intensity of light at the third region of the structure;

converting the third intensity of light into a fourth coating thickness of the existing coating present on the third region of the structure; and in response to the fourth thickness of the existing coating in the third region of the structure exceeding the maximum existing coating thickness, storing a third flag for removing the existing coating from the third region of the structure prior to application of the coating.

9. The method of claim 1:

wherein applying the coating to the second region of the structure comprises pumping the coating, comprising phosphorescent particles configured to phosphoresce at a first wavelength, through a chamber toward the spray nozzle at a flow rate;

wherein illuminating the coating applied to the second region of the structure comprises irradiating the chamber at a radiation flux corresponding to the flow rate;

wherein detecting the intensity of light comprises detecting the intensity of light at the first wavelength emitted by phosphorescent particles in the coating; and wherein converting the intensity of light into the second coating thickness comprises calculating the second coating thickness of the coating applied to the second region of the structure proportional to the intensity of light in the first wavelength and inversely proportional to the radiation flux.

10. The method of claim 1:

wherein applying the coating to the second region of the structure comprises spraying the coating, comprising particles configured to absorb light in a first wavelength, onto the second region of the structure via the spray nozzle;

wherein illuminating the coating applied to the second region of the structure comprises illuminating the second region of the structure with a target intensity of light at the first wavelength;

wherein detecting the intensity of light comprises detecting the intensity of light at the first wavelength absorbed by particles in the coating; and wherein converting the intensity of light into the second coating thickness comprises calculating the second coating thickness of the coating applied to the second region of the structure inversely proportional to the intensity of light in the second wavelength and proportional to the target intensity of light at the second wavelength.

11. The method of claim 1, further comprising:

capturing a first pre-coating photographic image of the first region of the structure prior to application of the coating onto the first region of the structure;

capturing a first post-coating photographic image of the first region of the structure following application of the coating onto the first region of the structure;

capturing a second pre-coating photographic image of the second region of the structure prior to application of the coating onto the second region of the structure;

capturing a second post-coating photographic image of the second region of the structure following application of the coating onto the second region of the structure;

assembling the first pre-coating photographic image and the second pre-coating into a pre-coating composite photographic representation of the structure prior to application of the coating;

assembling the first post-coating photographic image and the second post-coating into a post-coating composite photographic representation of the structure following application of the coating;

generating a coating thickness map representing the structure and comprising a virtual grid containing:
  the first segment corresponding to the first region of the structure; and
  the second segment corresponding to the second region of the structure;

spatially aligning the pre-coating composite photographic representation, the post-coating composite photographic representation, and the coating thickness map; and storing the pre-coating composite photographic representation, the post-coating composite photographic representation, and the coating thickness map in a digital record associated with the structure.

* * * * *